(12) United States Patent
Ishizaki

(10) Patent No.: US 10,447,527 B2
(45) Date of Patent: Oct. 15, 2019

(54) COMMUNICATION SYSTEM

(71) Applicant: HONDA MOTOR CO., LTD., Tokyo (JP)

(72) Inventor: Ryusuke Ishizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/562,164

(22) PCT Filed: Mar. 4, 2016

(86) PCT No.: PCT/JP2016/056760
§ 371 (c)(1),
(2) Date: Sep. 27, 2017

(87) PCT Pub. No.: WO2016/158203
PCT Pub. Date: Oct. 6, 2016

(65) Prior Publication Data
US 2018/0083827 A1   Mar. 22, 2018

(30) Foreign Application Priority Data
Mar. 30, 2015   (JP) .................................. 2015-070252

(51) Int. Cl.
*H04L 12/24* (2006.01)
*H04L 12/427* (2006.01)
*H04L 12/933* (2013.01)
*H04L 29/06* (2006.01)
*H04L 12/433* (2006.01)

(52) U.S. Cl.
CPC ........ *H04L 41/0677* (2013.01); *H04L 12/427* (2013.01); *H04L 12/433* (2013.01); *H04L 49/102* (2013.01); *H04L 69/22* (2013.01)

(58) Field of Classification Search
CPC combination set(s) only.
See application file for complete search history.

(56) References Cited

U.S. PATENT DOCUMENTS

2001/0048687 A1* 12/2001 Coden ..................... H04L 12/42
370/403
2005/0135278 A1    6/2005 Hall et al.
2008/0285562 A1* 11/2008 Scott ................. G06F 15/17362
370/392
(Continued)

FOREIGN PATENT DOCUMENTS

| JP | 56-132840 | 10/1981 |
| JP | 57-069955 | 4/1982 |
| JP | 08-149148 | 6/1996 |

(Continued)

OTHER PUBLICATIONS

International Search Report, dated May 17, 2016 (May 17, 2016), 2 pages.
European Search Report dated Jun. 13, 2018, 9 pages.

*Primary Examiner* — Yee F Lam
(74) *Attorney, Agent, or Firm* — Rankin, Hill & Clark LLP

(57) ABSTRACT

A communication system wherein, in each node, data transmission blocks transmit transmission data, and data relay blocks relay the transmission data from another node in a prior stage as relay data. Output switching units switch between outputting the transmission data and outputting the relay data as output data.

3 Claims, 14 Drawing Sheets

(56) References Cited

U.S. PATENT DOCUMENTS

2016/0149835 A1* 5/2016 Ikarashi .................. H04L 49/40
370/389

FOREIGN PATENT DOCUMENTS

| JP | 10-164112 | 6/1998 |
| JP | 2001-326663 | 11/2001 |
| JP | 2002-330146 | 11/2002 |
| JP | 2003-218977 | 7/2003 |
| JP | 2010-193217 | 9/2010 |
| JP | 2013-010165 | 1/2013 |

\* cited by examiner

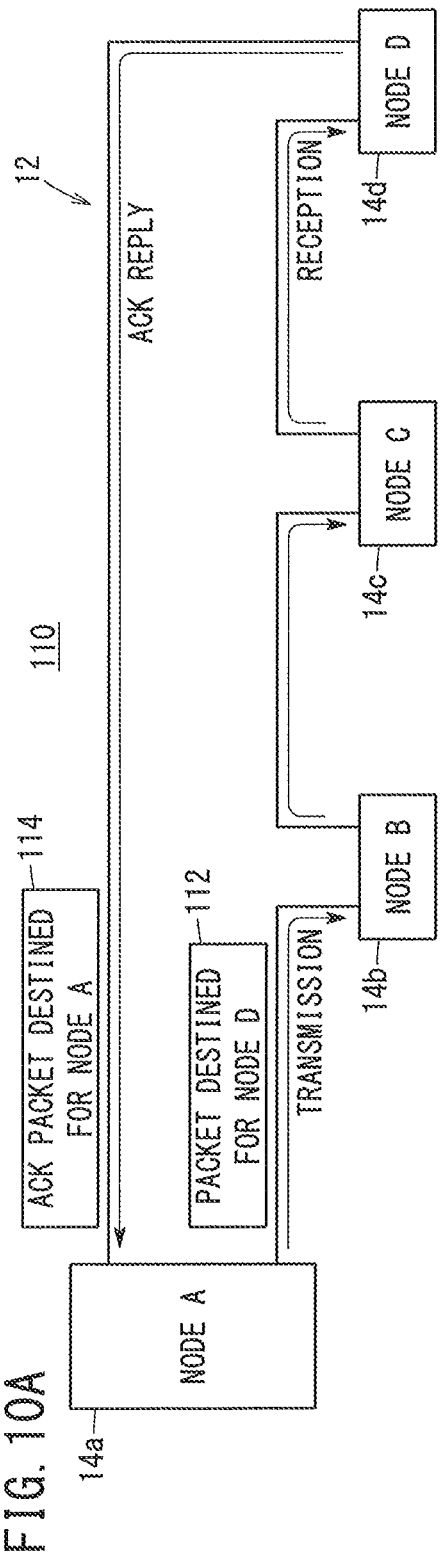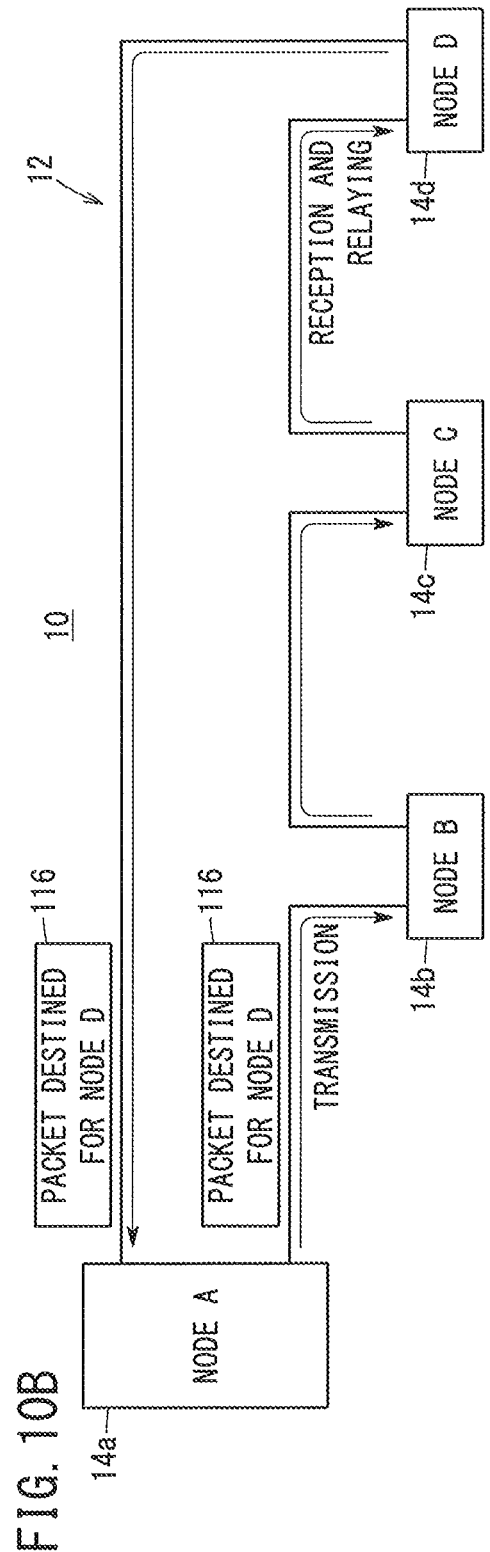

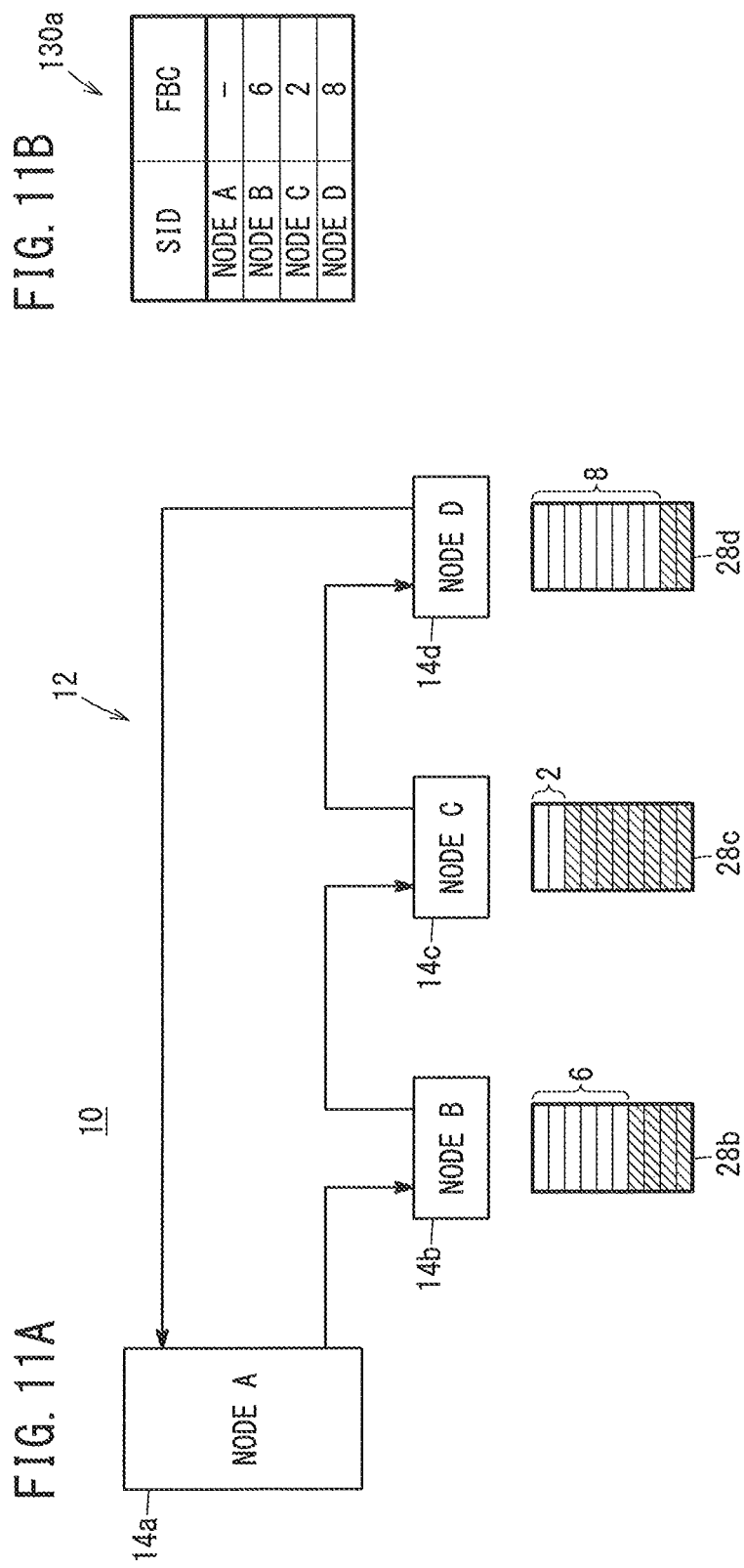

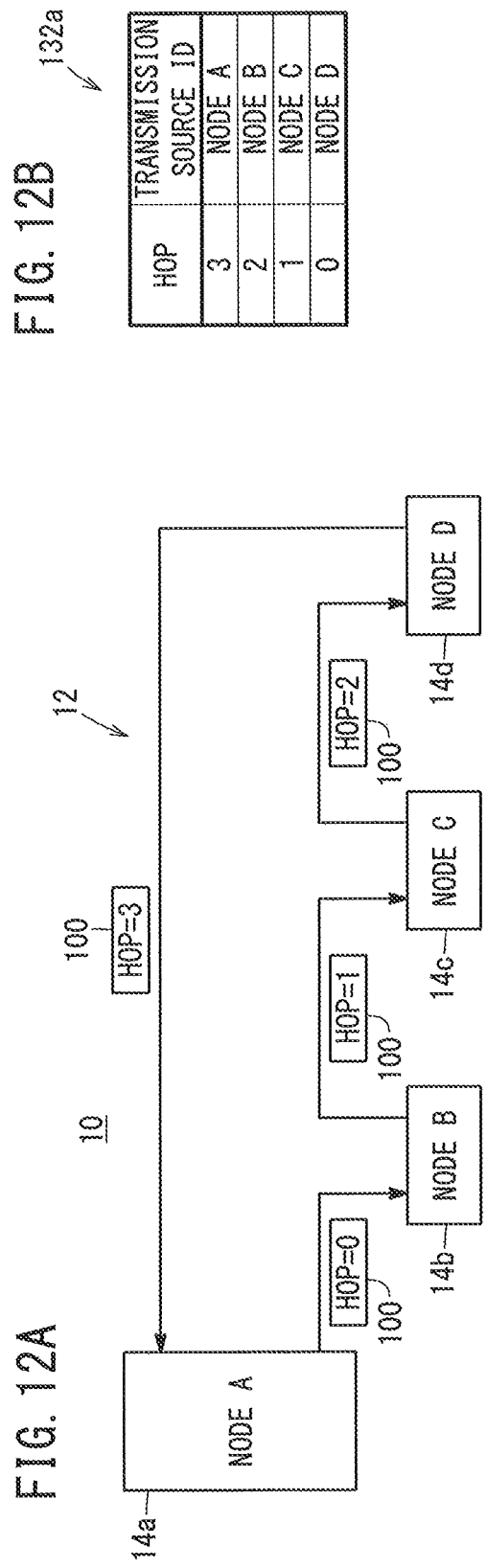

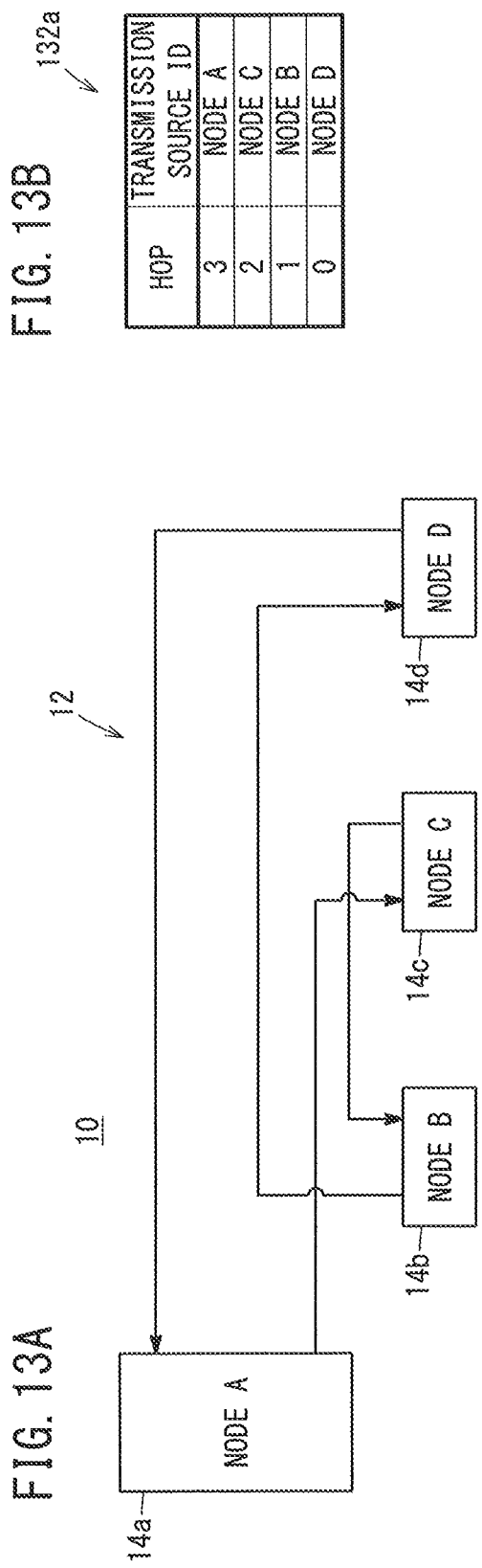

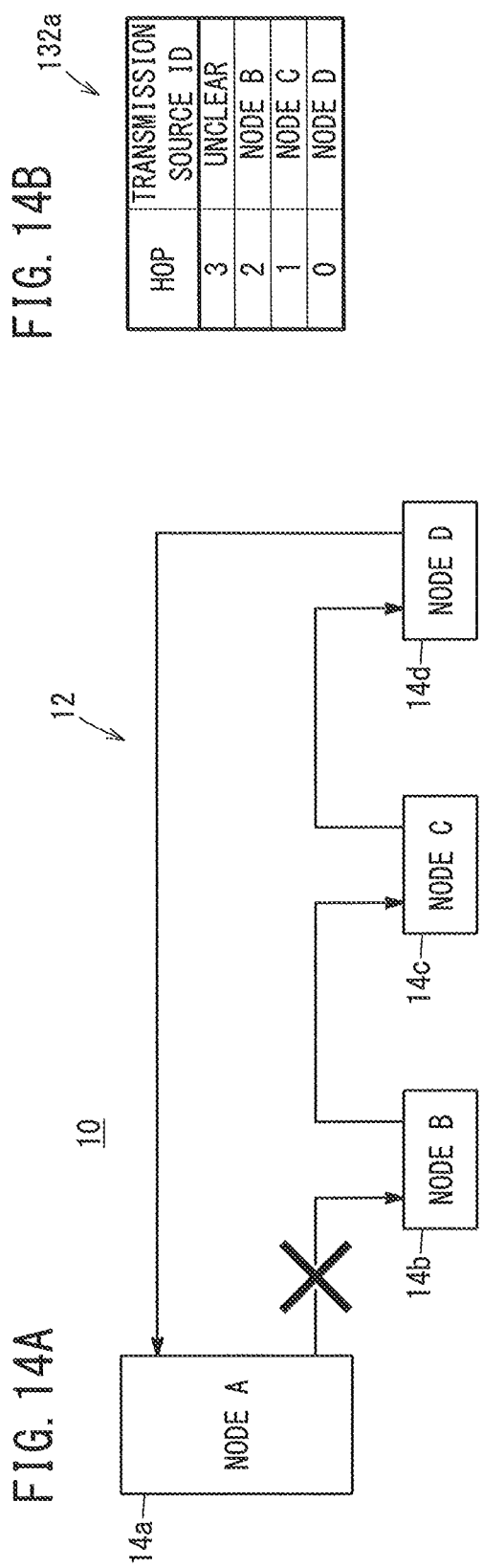

COMMUNICATION SYSTEM

TECHNICAL FIELD

The present invention relates to a communication system that uses a ring type network in which a plurality of network nodes forms a ring-like shape, and performs communications in one direction.

BACKGROUND ART

In Japanese Laid-Open Patent Publication No. 2001-326663, it is disclosed that, in the case that a plurality of computers are connected to a token ring type of loop transmission path, a computer that has acquired a free token which circulates around the loop transmission path transmits transmission data and a busy token to a specified computer via the loop transmission path.

SUMMARY OF INVENTION

As described above, in conventional token passing system communications, a free token, which provides a right of transmission, is circulated within the loop transmission path (ring type network), and therefore, only a computer (network node) that has acquired such a free token is capable of transmitting transmission data.

On the other hand, in an Ethernet type of system or the like, any network node is capable of freely transmitting data. In this case, since there is a possibility of data collision, as a method of collision avoidance, for example, it may be considered to randomly set a transmission wait time. However, if the transmission wait time is set randomly, it is difficult for this technique to be applied in a communication system requiring low latency, such as intra-body communications for a robot.

Thus, an object of the present invention is to provide a communication system which is capable of realizing low latency data communications, together with improving network efficiency, by enabling all of the network nodes of a ring type network to simultaneously carry out data communications without causing the occurrence of data collision.

The present invention is a communication system that utilizes a ring type network in which a plurality of network nodes forms a ring-like shape, and is adapted to perform communications in one direction, and in order to achieve the aforementioned object, each of the network nodes comprises a data transmission unit, a data reception unit, and an output switching unit.

In this case, the data transmission unit includes a data transmission block adapted to transmit data generated by its own network node (hereinafter also referred to as a "host network node") as transmission data, and a data relay bock adapted to relay transmission data transmitted from other network nodes as relay data. The data reception unit is adapted to receive the transmission data transmitted from the other network nodes as reception data. The output switching unit is adapted to switch and output as output data either one of the data from among the transmission data transmitted by the data transmission block, or the relay data relayed by the data relay block.

Ordinarily, in the ring type network which has a ring type of network topology, each of the network nodes is constructed with a transmission line and a reception line being separated. Therefore, it can be considered that the transmission lines of each of the network nodes possess exclusive ownership rights respectively in relation to data transmission.

Thus, according to the present invention, as a new protocol in a ring type network, as the output data, the output switching unit switches and outputs either one of the data from among the transmission data or the relay data. As a result of having constructed the new protocol of this type, with all of the network nodes, it becomes possible to simultaneously transmit the output data without causing any collisions to occur between the transmission data and the relay data. Accordingly, the present invention is capable of realizing a communication system in which both low latency and network efficiency are improved. As a result, according to the present invention, even concerning large volume data such as firmware (F/W) data and hardware (H/W) data, or log data and the like, it becomes possible for such data to be transferred in a shorter time in comparison with the conventional technique.

Further, on the premise of the characteristic configuration discussed above, the communication system according to the present invention may further include the following first through fifth characteristic aspects.

As a first aspect of the present invention, the output switching unit preferentially outputs as the output data the transmission data transmitted by the data transmission block. In accordance with this feature, it is possible for data communications to be carried out in real time, without causing collisions to occur between the relay data, which is transmission data from the other network nodes, and the transmission data of the host network node. As a result, even if all of the network nodes simultaneously carry out data communications, it is possible for data communications to be performed with high network efficiency without causing collisions between the data to occur.

Further, in the first aspect of the invention, the data relay block includes a relay data retaining unit adapted to temporarily retain the relay data during a period in which the output switching unit preferentially outputs the transmission data transmitted by the data transmission block. In accordance with this feature, since the relay data is output after output of the transmission data has been completed, it is possible to reliably avoid collisions between the relay data and the transmission data, and to enhance network efficiency.

Furthermore, in the first aspect of the invention, the data transmission block does not carry out transmission of next transmission data until the transmission data transmitted by the data transmission block travels around the ring type network and returns to the data transmission block. In accordance with this feature, it is possible to ensure a transmission time for the relay data, together with minimizing the relay time of the relay data. Further, it is also possible to effectively avoid collisions between the relay data and the transmission data, and to enhance network efficiency.

Further still, in the first aspect of the invention, the output switching unit outputs to the data transmission block or the data relay block an output wait signal instructing to wait on outputting the data, and a block to which the output wait signal has not been input from among the data transmission block or the data relay block transmits data to the output switching unit. In accordance with this feature, it is possible to reliably avoid collisions between the relay data and the transmission data.

As a second aspect of the present invention, at least one from among the data transmission unit and the output switching unit of each of the network nodes includes an error detecting unit adapted to detect an abnormality in the data while outputting the data in accordance with an on-the-fly method. In this case, when the error detecting unit detects an abnormality in the data, the data transmission unit or the output switching unit that includes the error detecting unit adds to the data error data indicative of the fact that an abnormality exists in the data, and then outputs the data.

In order to reduce idle time insofar as possible and to realize low latency communications, in the case of outputting data using an on-the-fly method, the error data is added with respect to the abnormal data, and then the data is output. As a result, by confirming the error data, the subsequent stage block can easily grasp that the data input thereto is abnormal data, and can discard the abnormal data at an early stage. Consequently, it is possible to send out normal data that is to be transmitted next as soon as possible, as well as to keep to a minimum any decrease in network efficiency.

Further, in the second aspect of the invention, in the event that an abnormality in the data is detected by the error detecting unit, the data transmission unit or the output switching unit that includes the error detecting unit truncates output of the data midway, adds the error data to the end of the truncated data, and then outputs the data. Owing to this feature, in the subsequent stage block, it is possible to grasp and discard the abnormal data at an early stage, and any reduction in network efficiency can reliably be suppressed.

Furthermore, in the second aspect of the invention, at a time that the output switching unit or the data transmission unit of a subsequent stage receives the truncated data, and the error data is detected by its own error detecting unit, the output switching unit or the data transmission unit of the subsequent stage discards the truncated data, and outputs idle data. In accordance with this feature, it is possible to avoid continuing to circulate the truncated data around the ring type network.

Further still, in the second aspect of the invention, the error detecting unit is disposed in the data relay block of each of the network nodes, and in the event that an abnormality in the relay data is detected by the error detecting unit, the data relay block sequentially outputs the truncated relay data and the error data, and thereafter, outputs other idle data until the next relay data is input thereto. Owing to this feature, in the subsequent stage block, it is possible to easily grasp that, from within the relay data that was input thereto, the data up to just before the error data is abnormal data.

In a third aspect of the present invention, the data transmission block of each of the network nodes includes a transmission completion determination unit adapted to determine whether or not the reception data is transmission data generated by the host network node. In addition, in the event it is determined by the transmission completion determination unit that the reception data is transmission data generated by the host network node, the data transmission block completes transmission of the transmission data.

Conventionally, transmission data is transmitted from the host network node to a transmission destination network node, and the host network node receives an acknowledgment (ACK) from the transmission destination network node which has received the transmission data, whereupon transmission of the transmission data is completed. In this case, it is possible to guarantee that the transmission destination network node has received the transmission data. Notwithstanding, on the other hand, there has been a problem in that latency is increased.

In contrast thereto, according to the third aspect of the invention, since the data transmission block includes the transmission completion determination unit, the transmission data that is transmitted from the host network node travels around the ring type network, and when the transmission data is received as reception data by the host network node, transmission of the transmission data can be completed. In accordance with this feature, although there is no guarantee that the transmission destination network node has received the transmission data, it is assured that there are no abnormalities in the ring type network, together with enabling low latency data communications.

Further, in the third aspect of the invention, the transmission data and the reception data are packet data including a header part, a data part, and a trailer part, and ID information of the host network node is embedded in the header part, and ID information of a transmission destination network node is embedded in the trailer part. In this case, the transmission completion determination unit determines that the reception data is transmission data generated at the host network node, if the ID information embedded in the header part matches with the ID information of the host network node. In addition, the data transmission block receives a determination result of the transmission completion determination unit, completes transmission of the transmission data, and then discards the transmission data.

In accordance with this feature, it becomes possible to efficiently determine completion of transmission of the transmission data, together with carrying out packet communications with low latency.

In the fourth aspect of the invention, each of the network nodes further comprises a memory, and the data transmission block of each of the network nodes embeds in the transmission data the ID information of the host network node and available capacity information of the memory, and then transmits the transmission data.

In accordance with this feature, other network nodes that have received the transmission data as the relay data or the reception data are able to easily grasp how much available capacity exists in the memory of the transmission source network node (i.e., the host network node). Consequently, when data is transmitted with respect to the transmission source network node, the other network nodes may transmit an amount of data while taking into consideration the amount of available capacity. As a result, it is possible to avoid discarding of preciously transmitted data by the transmission destination network node due to there being no available capacity in the memory of the transmission destination network node, and therefore, the data can reliably be transmitted.

Further, since the respective network nodes embed the ID information and the available space information in the transmission data and then transmit the data, there is no need for the respective network nodes to make an inquiry with respect to the transmission source network node concerning the available capacity. As a result, data communications can be performed with low latency.

Further, in the fourth aspect of the invention, each of the network nodes further comprises an available capacity information register in which there are stored the ID information of the respective network nodes and the available capacity information of the memories. In this case, at each time that the reception data is received, the data reception unit of each of the network nodes stores in the available capacity information register ID information of the other network nodes, and available capacity information of the memories included within the reception data. In accordance with this feature, each time that the reception data is received, the content of the available capacity information register is updated.

Therefore, each of the network nodes can easily grasp the most recent available capacity of each of the memories, and thus, efficient data communications with low latency are made possible while taking into account the most recent available capacity of the memories.

Further, in the fourth aspect of the invention, the transmission data and the reception data are packet data including a header part, a data part, and a trailer part, and the data transmission block of each of the network nodes embeds the ID information of the host network node in the header part, and embeds the available capacity information in the trailer part. As a result, by way of packet communications, it is possible to efficiently notify the other network nodes concerning the available capacity of the memory of the host network node.

In a fifth aspect of the present invention, the data transmission block of each of the network nodes embeds in the transmission data a hop count and the ID information of the host network node, and then transmits the transmission data. Further, the data relay block of each of the network nodes transmits the relay data after having incremented the hop count of the other network nodes included within the relay data.

In accordance with this feature, from the ID information and the hop counts included within the reception data, or the ID information and the hop counts included within the relay data, each of the network nodes is capable of easily grasping in what kind of positional relationship the transmission source network node of the reception data and the relay data is with respect to the host network node, and furthermore, the state of connection of the transmission source network node in the ring type network.

Further, in the fifth aspect of the invention, each of the network nodes further comprises a hop count register in which there are stored, at each time that the reception data is received by the data reception unit, the ID information and the hop count of each of the network nodes included within the reception data. Owing to this feature, since the content of the hop count register is updated each time that the reception data is received, each of the network nodes is capable of easily grasping the most recent positional relationship of the other network nodes with respect to the host network node, as well as the most recent state of connection of the other network nodes in the ring type network.

Furthermore, in the fifth aspect of the invention, a set value of ID information of the respective network nodes and the hop count of the respective network nodes with respect to the host network node preferably are stored beforehand in the hop count register of each of the network notes. In accordance with this feature, at each time that the reception data is received, the data reception unit of each of the network nodes compares the ID information and the hop count of the respective network nodes included within the reception data with the set value that is stored in the hop count register, and thereby is capable of determining the presence or absence of a connection error of each of the network nodes in the ring type network.

Further still, in the fifth aspect of the present invention, in the event that the transmission data is not received as reception data, even after a certain time period has elapsed from the data transmission block having embedded the hop count and the ID information of the host network node, and having transmitted the transmission data, the data reception unit of each of the network nodes is capable of determining that a malfunction has occurred in the ring type network.

Further, in the fifth aspect of the invention, the data transmission block of each of the network nodes preferably transmits at regular intervals the transmission data in which there are embedded the hop count and the ID information of the host network node. Owing to this feature, if the hop count from a certain network node is not renewed at the regular interval, it can easily be determined that the network node is faulty, or that some type of malfunction is taking place in the ring type network.

Furthermore, in the fifth aspect of the invention, the transmission data, the relay data, and the reception data are packet data including a header part, a data part, and a trailer part, and the ID information and the hop count of the host network node preferably are embedded in the header part. In accordance with this feature, it is possible to reliably notify the other network nodes concerning the ID information and the hop count of the host network node.

BRIEF DESCRIPTION OF DRAWINGS

FIG. 10A is an explanatory diagram of a conventional transmission completion determination and FIG. 10B is an explanatory diagram of a transmission completion determination performed by way of a third characteristic function of the present embodiment;

FIG. 11A is an explanatory diagram of a fourth characteristic function of the present embodiment and FIG. 11B is a configuration diagram of an available capacity information register;

FIG. 12A is an explanatory diagram during normal operation of a fifth characteristic function of the present embodiment and FIG. 12B is a configuration diagram of a hop count register during normal operation thereof;

FIG. 13A is an explanatory diagram at a time of a connection error of the fifth characteristic function of the present embodiment and FIG. 13B is a configuration diagram of the hop count register at the time of the connection error;

FIG. 14A is an explanatory diagram during a malfunction of the fifth characteristic function of the present embodiment and FIG. 14B is a configuration diagram of the hop count register during malfunctioning thereof.

DESCRIPTION OF EMBODIMENTS

A preferred embodiment of a communication system according to the present invention will be presented and described in detail below with reference to the accompanying drawings.

[Schematic Configuration of Communication System 10]

Figure 1:
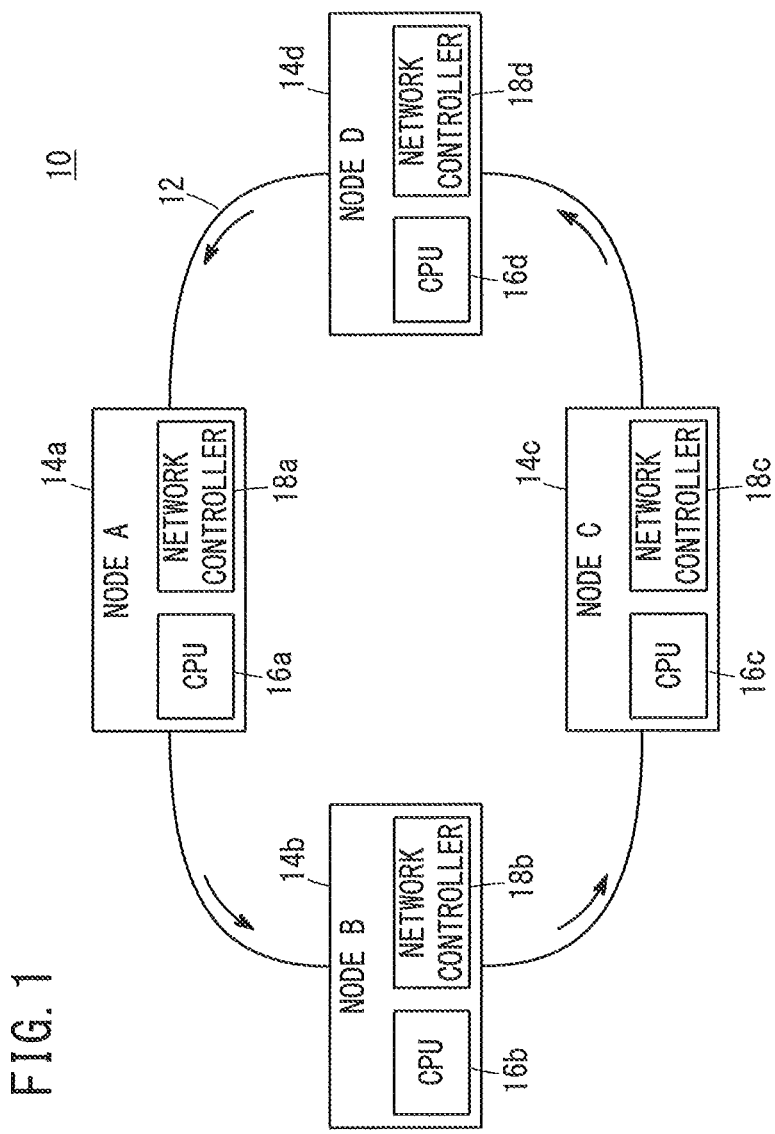
FIG. 1 is a configuration diagram of a communication system according to a present embodiment.

As shown in FIG. 1, the communication system 10 according to the present embodiment is a configuration in which a plurality of network nodes 14a to 14d are connected in a ring-like shape to a ring type network 12 which has a ring type of network topology. In the ring type network 12, each of the network nodes 14a to 14d performs unidirectional data communications in the direction of the arrows shown in FIG. 1. In the following description, the ring type network 12 is referred to simply as a network 12, and the network nodes 14a to 14d are also referred to simply as nodes 14a to 14d or nodes A to D. Further, in the present specification, in the case that a plurality of constituent elements are referred to collectively, for example, expressions using the word "to" as in the phrase "nodes 14a to 14d", are displayed in certain cases in the drawings using a hyphen, as in "14a(b-d)".

The communication system 10 is applied, for example, to intra-body communications for a robot, which is a mobile body (not shown), and functions as a distributed control system for a plurality of control targets provided in the robot. More specifically, the respective nodes 14a to 14d function as a main control unit or as a plurality of sub-control units for the robot, and serve to carry out transmission and reception of various data such as control data or the like between the main control unit and the plurality of sub-control units via the network 12.

The main control unit transmits control data for issuing instructions to control various control targets. On the basis of the received control data, the sub-control units operate a head part and respective joints of the robot, by driving and controlling motors or devices that serve as the control targets. Since the configuration of the robot and the distributed control system for the robot are well known (for example, refer to Japanese Laid-Open Patent Publication No. 2013-010165), detailed descriptions of such features are omitted.

Each of the respective nodes 14a to 14d includes a CPU 16a to 16d for controlling respective units contained within that node 14a to 14d, and a network controller 18a to 18d for carrying out data communications between that node 14a to 14d and other nodes 14a to 14d via the network 12. The CPUs 16a to 16d correspond to ECUs for controlling the main control unit and the sub-control units for the robot. The network controllers 18a to 18d correspond to communication units for the main control unit and the sub-control units.

[Schematic Configuration of the Respective Nodes 14a to 14d]

Figure 2:
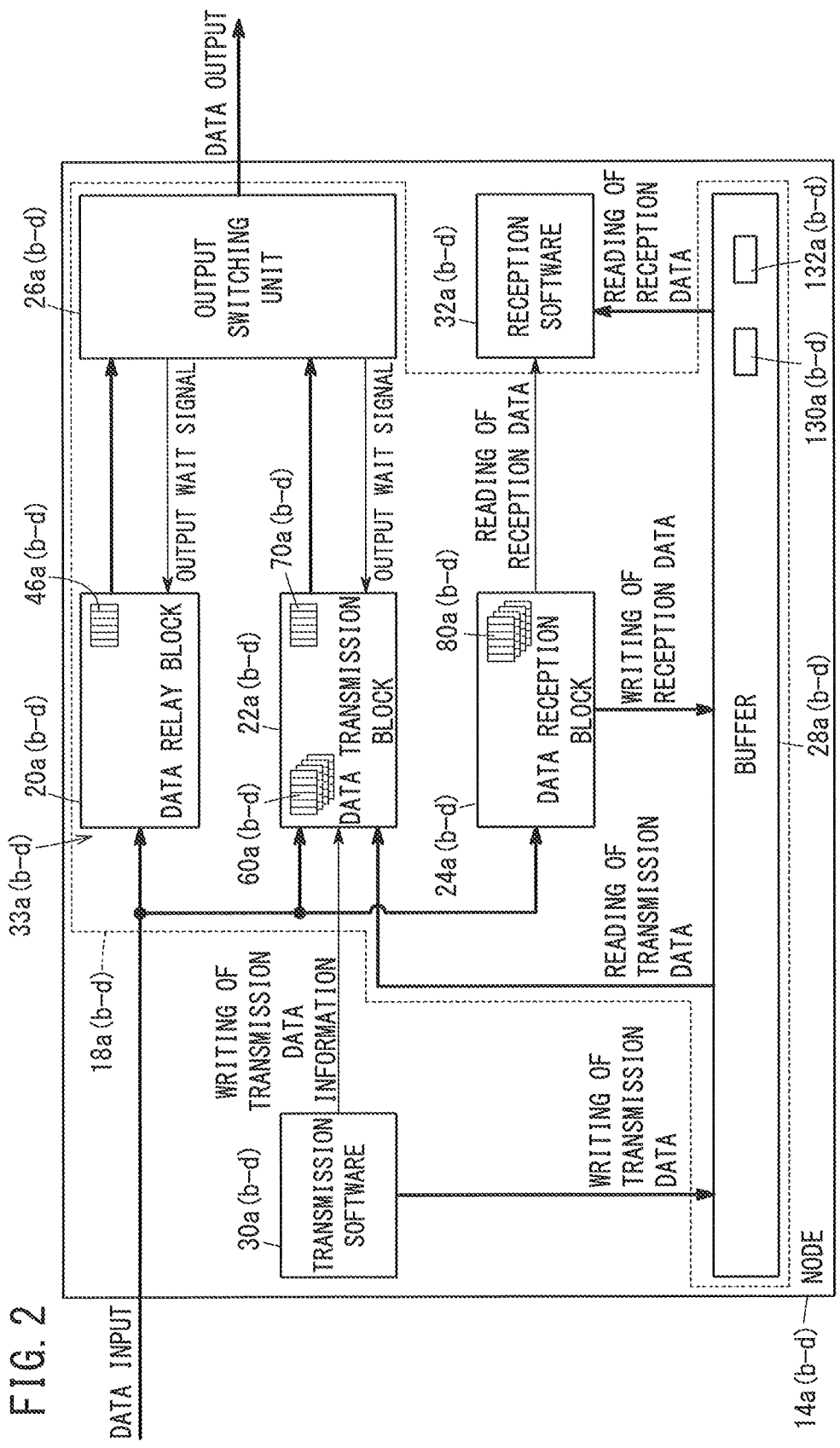
FIG. 2 is a block diagram of a node shown in FIG. 1.

FIG. 2 is a block diagram showing a schematic configuration of the interior of each of the nodes 14a to 14d. As shown in FIG. 2, the configuration of the network controllers 18a to 18d, which are responsible for the communications function, will be specifically shown and described in relation to each of the nodes 14a to 14d. Further, the respective nodes 14a to 14d are configured substantially in the same manner. In FIG. 2 and the figures thereafter, in the case that both thick arrow lines and narrow arrow lines are shown, the thick arrow lines indicate the flow of data, whereas the thin arrow lines indicate the flow of control signals.

The network controllers 18a to 18d of the respective nodes 14a to 14d each includes, respectively, a data relay block 20a to 20d, a data transmission block 22a to 22d, a data reception block 24a to 24d that functions as a data reception unit, an output switching unit 26a to 26d, and a buffer 28a to 28d that functions as a memory.

In FIG. 2, the CPU 16a to 16d reads and executes transmission software 30a to 30d and reception software 32a to 32d, which are programs stored in a non-illustrated memory, to thereby implement a transmission process for transmission data as well as a reception process for reception data at each of the network controllers 18a to 18d. Further, the data relay block 20a to 20d and the data transmission block 22a to 22d make up a data transmission unit 33a to 33d, which is responsible for carrying out a data transmission function.

In this instance, the respective components of the network controller 18a to 18d function roughly in the following manner.

The data relay block 20a to 20d relays the transmission data that is transmitted from another node on an upstream side (preceding stage) in the network 12 as relay data, and outputs the data to the output switching unit 26a to 26d. The transmission data transmitted from the other preceding stage node is received respectively by the data relay block 20a to 20d, the data transmission block 22a to 22d, and the data reception block 24a to 24d.

The transmission software 30a to 30d writes into the buffer 28a to 28d the transmission data, which is the data to be transmitted by its own node (referred to as a "host node"), together with outputting to the data transmission block 22a to 22d transmission data information, which indicates that the transmission data has been written to a predetermined address in the buffer 28a to 28d. The data transmission block 22a to 22d reads the applicable transmission data from the buffer 28a to 28d on the basis of the transmission data information that was input thereto, and outputs the read transmission data to the output switching unit 26a to 26d. Moreover, for example, assuming the case of the above-described robot, the transmission data refers to control data that is transmitted from the main control unit to the sub-control units, and the detection results of various sensors as devices of the robot.

The output switching unit 26a to 26d outputs to the data relay block 20a to 20d or to the data transmission block 22a to 22d an output wait signal instructing to wait on outputting the data. Consequently, one block from among the data relay block 20a to 20d or the data transmission block 22a to 22d that has received the output wait signal stops outputting data to the output switching unit 26a to 26d, and together therewith, another block that has not received the output wait signal executes outputting of data to the output switching unit 26a to 26d.

Stated otherwise, the output switching unit 26a to 26d switches the block that outputs data, by outputting the output wait signal to either the data relay block 20a to 20d or the data transmission block 22a to 22d. Therefore, by switching input of the transmission data or the relay data, the output switching unit 26a to 26d transmits the data that is input thereto from either one of the blocks as output data to another node on a downstream side (subsequent stage) of the network 12.

In the event that the transmission data transmitted from the other preceding stage node is data that is addressed to the host node, the data reception block 24a to 24d receives the transmission data as reception data, and writes the reception data in the buffer 28a to 28d. Further, the data reception block 24a to 24d notifies the reception software 32a to 32d concerning the reception data information, which indicates that the reception data has been written to a predetermined address within the buffer 28a to 28d.

The reception software 32a to 32d reads the applicable reception data from the buffer 28a to 28d on the basis of the reception data information that was notified thereto. Consequently, for example, in the case of the above-described robot, if the host node is a sub-control unit, the CPU 16a to 16d thereof is made capable of driving and controlling the control targets on the basis of the control data, which serves as reception data and is sent from the main control unit. Further, if the host node is the main control unit, the CPU 16a to 16d thereof is made capable of generating new control data for the sub-control units, on the basis of the detection results of the sensors, which serve as reception data and is sent from the sub-control units.

With the network controller 18a to 18d in each of the nodes 14a to 14d, in order to reduce idle time insofar as possible and realize low latency data communications, predetermined processes are executed with respect to the relay data while the relay data flows in accordance with an on-the-fly method. Moreover, concerning the transmission data and the reception data as well, predetermined processes may also be performed on such data while the data flows in accordance with an on-the-fly method.

Next, detailed configurations of the data relay block 20a to 20d, the data transmission block 22a to 22d, the data reception block 24a to 24d, and the output switching unit 26a to 26d will be described with reference to FIGS. 3 to 6.

[Configuration of Data Relay Blocks 20a to 20d]

Figure 3:
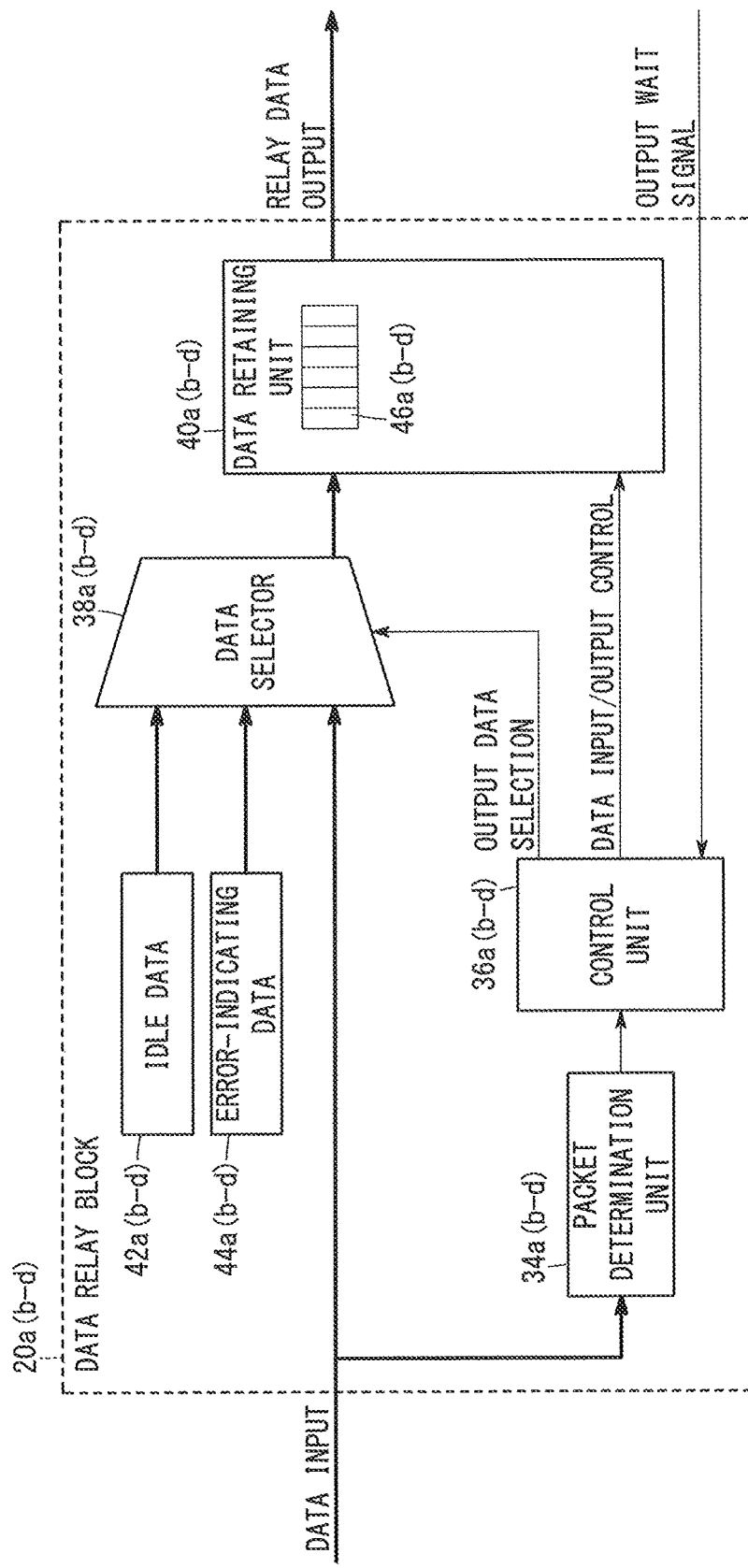
FIG. 3 is a block diagram of a data relay block shown in FIG. 2.

As shown in FIG. 3, each of the data relay blocks 20a to 20d includes a packet determination unit (error detecting unit) 34a to 34d, a control unit 36a to 36d, a data selector 38a to 38d, and a data retaining unit (relay data retaining unit) 40a to 40d.

The packet determination unit 34a to 34d executes a predetermined determination process on packets 100 (see FIG. 7), which are transmission data received from another preceding stage node.

The structure of the packets 100 will be described with reference to FIG. 7. Moreover, in the present embodiment, each of the transmission data, the relay data, and the reception data includes a structure in the form of a packet 100.

The packet 100 is constituted by packet data composed of a header part, a data part, a trailer part, and a CRC part, in this order.

The header part is made up from a "code" section in which a predetermined code is stored, a "SOP" section indicating the head of the packet 100, a "HOP" section for storing a hop count as a relay number, and a "SID" section in which ID information of the transmission source nodes 14a to 14d is stored. In the data part, predetermined data are stored, such as control data and the detection results of sensors, etc. The trailer part of the packet 100 is made up from an "EOP" section which indicates the end of the packet, an "FBC" section in which there is stored a free buffer size (available capacity information) of the buffers 28a to 28d, a "DID" section in which there is stored ID information of the transmission destination nodes 14a to 14d, and a "PRI" section which indicates a priority of the packet 100. In the CRC part, there is stored a CRC value which is used in a cyclic redundancy check.

Accordingly, in the network 12, the packets 100 are transmitted as transmission data or relay data in the direction of the arrows shown in FIG. 1.

Returning to FIG. 3, in the case that a packet 100, which is relay data, flows in the data relay block 20a to 20d in accordance with an on-the-fly method, the packet determination unit 34a to 34d determines whether or not the CRC value, which is stored in the CRC section that constitutes part of the packet 100, is an abnormal value, and outputs a determination result thereof to the control unit 36a to 36d.

Further, the packet determination unit 34a to 34d compares the ID information of the transmission source, which is stored in the "SID" section of the packet 100, with the ID information of the host node, and if both of the ID information match, then a determination is made that the packet 100 is transmission data that was transmitted from the host node, has traveled around the network 12, and has returned to the host node. The packet determination unit 34a to 34d also outputs such a determination result to the control unit 36a to 36d.

Upon receiving the determination result of the packet determination unit 34a to 34d, the control unit 36a to 36d supplies an output data selection signal to the data selector 38a to 38d, whereby a control is performed to transfer the data output from the data selector 38a to 38d to the data retaining unit 40a to 40d.

More specifically, in the case that the determination result of the packet determination unit 34a to 34d is a determination result indicating that the packet 100 is a normal packet 100, or a determination result indicating that the packet 100 is not addressed to the host node, the control unit 36a to 36d supplies an output data selection signal to the data selector 38a to 38d providing an instruction to output the packet 100 to the data retaining unit 40a to 40d. The data selector 38a to 38d receives the supply of the output data selection signal, and outputs the packet 100 to the data retaining unit 40a to 40d.

Further, in the case that the determination result of the packet determination unit 34a to 34d is a determination result indicating that the packet 100 is an abnormal packet 100, the control unit 36a to 36d supplies an output data selection signal to the data selector 38a to 38d providing an instruction of data output when the packet is abnormal data. The data selector 38a to 38d receives the supply of the output data selection signal, and truncates the output process of the packet 100 midway. Next, the data selector 38a to 38d, following the truncated packet 100, adds error-indicating data (error data) 44a to 44d indicating that the packet 100 is abnormal, and then outputs the packet 100 to the data retaining unit 40a to 40d. Thereafter, the data selector 38a to 38d outputs idle data 42a to 42d to the data retaining unit 40a to 40d, to indicate that there is no data after the truncated packet 100.

Stated otherwise, in the case that the output data selection signal corresponding to the abnormal packet 100 is supplied thereto, the data selector 38a to 38d outputs to the data retaining unit 40a to 40d the concerned packet 100, for which output processing thereof was truncated midway, the error-indicating data 44a to 44d, and the idle data 42a to 42d in this order. In this case, the data selector 38a to 38d continues to output the idle data 42a to 42d to the data retaining unit 40a to 40d, until a normal packet 100 (next data) is input from another node to the data relay block 20a to 20d, and an output data selection signal providing an instruction to output the normal packet 100 with respect to the data retaining unit 40a to 40d is supplied to the data selector 38a to 38d from the control unit 36a to 36d.

Further, in the case that the determination result of the packet determination unit 34a to 34d is a determination result indicating that the packet 100 was transmitted from the host node, the control unit 36a to 36d supplies an output data selection signal to the data selector 38a to 38d providing an instruction to discard the concerned packet 100. The data selector 38a to 38d receives the supply of the output data selection signal, and discards the packet 100.

The data retaining unit 40a to 40d includes a FIFO type of buffer 46a to 46d. Accordingly, using a FIFO method, the data retaining unit 40a to 40d temporarily stores in the buffer 46a to 46d the data (the packet 100, the error-indicating data 44a to 44d, the idle data 42a to 42d) that is input sequentially from the data selector 38a to 38d, and thereafter, is capable of outputting the data as relay data to the output switching unit 26a to 26d (see FIG. 2).

In this instance, in the case that an output wait signal is input to the control unit 36a to 36d from the output switching unit 26a to 26d, the control unit 36a to 36d stops the output of the relay data from the data retaining unit 40a to 40d. Consequently, the data output from the data selector 38a to 38d to the data retaining unit 40a to 40d is temporarily retained in the buffer 46a to 46d.

On the other hand, in the case that an output wait signal is not input from the output switching unit 26a to 26d, the control unit 36a to 36d controls the data retaining unit 40a to 40d, and concerning the data temporarily stored in the buffer 46a to 46d, such data is output sequentially to the output switching unit 26a to 26d as relay data from a leading position of the buffer 46a to 46d.

Further, in the event that the relay data output from the data retaining unit 40a to 40d to the output switching unit 26a to 26d is the packet 100, the control unit 36a to 36d increments the hop count of the "HOP" section in the packet 100 by +1, when the packet 100 is output to the data retaining unit 40a to 40d from the data selector 38a to 38d, or when the packet 100 is temporarily retained in the buffer 46a to 46d of the data retaining unit 40a to 40d.

[Configuration of Data Transmission Blocks 22a to 22d]

Figure 4:
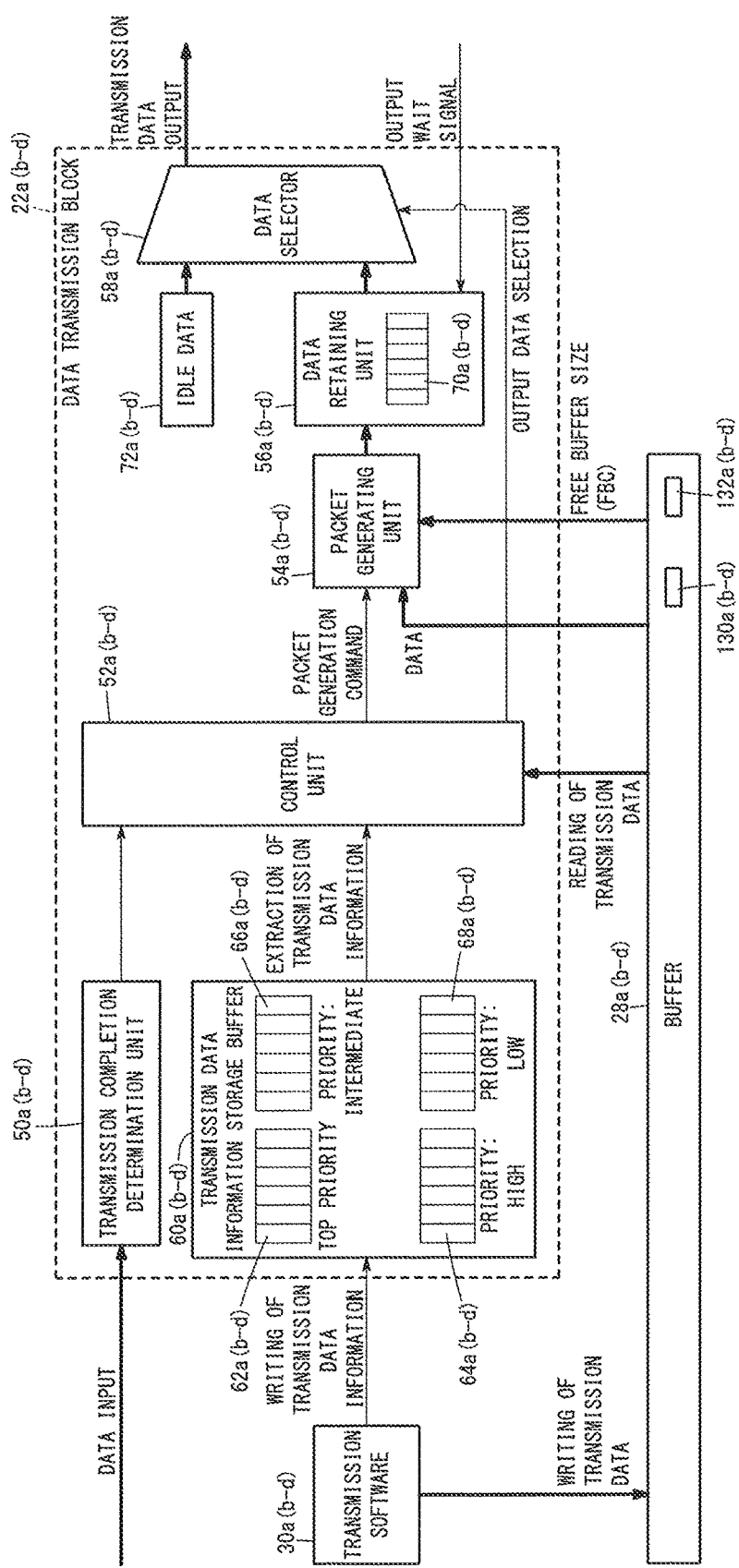
FIG. 4 is a block diagram of a data transmission block shown in FIG. 2.

As shown in FIG. 4, each of the data transmission blocks 22a to 22d includes a transmission completion determination unit 50a to 50d, a control unit 52a to 52d, a packet generating unit 54a to 54d, a data retaining unit 56a to 56d, a data selector 58a to 58d, and a transmission data information storage buffer 60a to 60d.

In the transmission completion determination unit 50a to 50d, within the packet 100, which is transmission data received from another preceding stage node, by comparing the ID information stored in the "SID" section with the ID information of the host node, it is determined whether or not the packet 100 is transmission data that was transmitted from the data transmission block 22a to 22d of the host node, has traveled around the network 12, and has returned to the host node. The transmission completion determination unit 50a to 50d also outputs such a determination result to the control unit 52a to 52d.

The transmission software 30a to 30d writes the transmission data information in the transmission data information storage buffer 60a to 60d. The transmission data information storage buffer 60a to 60d is constituted from a plurality of buffers 62a to 62d, 64a to 64d, 66a to 66d, and 68a to 68d, which are dependent on the priority of the transmission data. In this instance, the priority refers to the priority of the data that is transmitted as transmission data from the data transmission block 22a to 22d, and as the priority of such data becomes higher, the data is sent in preference to other data. Accordingly, the transmission software 30a to 30d sets in advance the priority of the data that is written into the buffer 28a to 28d, and in accordance with the set priority thereof, transmission data information is written into a desired one of the buffers 62a to 62d, 64a to 64d, 66a to 66d, and 68a to 68d.

The control unit 52a to 52d confirms whether or not the transmission data information is stored in each of the buffers 62a to 62d, 64a to 64d, 66a to 66d, and 68a to 68d, and then, from among the stored transmission data information, extracts the transmission data information in order of information having the highest priority. Next, the control unit 52a to 52d determines whether or not the data corresponding to the extracted transmission data information is written into the buffer 28a to 28d, and if such corresponding data exists, the control unit 52a to 52d outputs to the packet generating unit 54a to 54d a packet generation command instructing that the packet 100 be generated using the corresponding data. In this case, the control unit 52a to 52d may include the transmission data information in the packet generation command, and output the transmission data information to the packet generating unit 54a to 54d.

Furthermore, in the event that the determination result made by the transmission completion determination unit 50a to 50d is a determination result that the transmission data transmitted from another node is a packet 100 that was transmitted from the host node, traveled around the network 12, and returned to the host node, the control unit 52a to 52d supplies to the data selector 58a to 58d an output data selection signal that permits outputting of the transmission data (the next packet 100).

On the other hand, in the event that the determination result made by the transmission completion determination unit 50a to 50d is a determination result that the transmission data transmitted from another node is a packet 100 that has come from a transmission source other than the host node, the control unit 52a to 52d supplies to the data selector 58a to 58d an output data selection signal that prohibits outputting of the next packet 100, and instructs outputting of the idle data 72a to 72d.

On the basis of the packet generation command from the control unit 52a to 52d, the packet generating unit 54a to 54d reads out from the buffer 28a to 28d data corresponding to the packet generation command. Further, the packet generating unit 54a to 54d also confirms along therewith the free buffer size of the buffer 28a to 28d.

Figure 7:
FIG. 7 is an explanatory diagram of the data structure of a packet.

In addition, the packet generating unit 54a to 54d sets the HOP section, which is the hop count, to 0, sets the ID information of the host node in the SID section, stores the read data in the data section, stores the free buffer size in the FBC section, stores the ID information of the transmission destination in the DID section, and stores the priority of the data in the PRI section, and thereby generates the packet 100 shown in FIG. 7. The generated packet 100 is output to the data retaining unit 56a to 56d in order from the header part thereof.

The data retaining unit 56a to 56d includes a FIFO type of buffer 70a to 70d, and the packet 100, which is input in order from the header part thereof, is retained temporarily in the FIFO type buffer 70a to 70d. In the case that an output wait signal (see FIG. 2) is input to the data retaining unit 56a to 56d from the output switching unit 26a to 26d, the data retaining unit 56a to 56d does not output the packet 100 that was temporarily stored in the buffer 70a to 70d. On the other hand, in the case that an output wait signal is not input thereto, the data retaining unit 56a to 56d outputs to the data selector 58a to 58d the packet 100 that is temporarily retained in the buffer 70a to 70d in order from the leading position (header part) of the buffer 70a to 70d.

In the event that an output data selection signal that issues an instruction to output the packet 100, is supplied from the control unit 52a to 52d, the data selector 58a to 58d outputs the packet 100 as transmission data from the data retaining unit 56a to 56d to the output switching unit 26a to 26d. Further, in the event that an output data selection signal that issues an instruction to output the idle data 72a to 72d, is supplied from the control unit 52a to 52d, the data selector 58a to 58d outputs the idle data 72a to 72d to the output switching unit 26a to 26d.

Consequently, in the transmission completion determination unit 50a to 50d, in the case that a packet 100 transmitted from the host node has traveled around the network 12 and has returned to the host node, within the data transmission block 22a to 22d, a determination is made that transmission of the packet 100 is completed, and if there is no input of the output wait signal, it is possible to output a next packet 100 from the data selector 58a to 58d to the output switching unit 26a to 26d.

On the other hand, in the event that transmission of the packet 100 transmitted from the host node has not been completed, then within the data transmission block 22a to 22d, transmission of the next packet 100 to the output switching unit 26a to 26d is prohibited, and if there is no input of an output wait signal, the idle data 72a to 72d is output from the data selector 58a to 58d to the output switching unit 26a to 26d.

[Configuration of Data Reception Blocks 24a to 24d]

Figure 5:
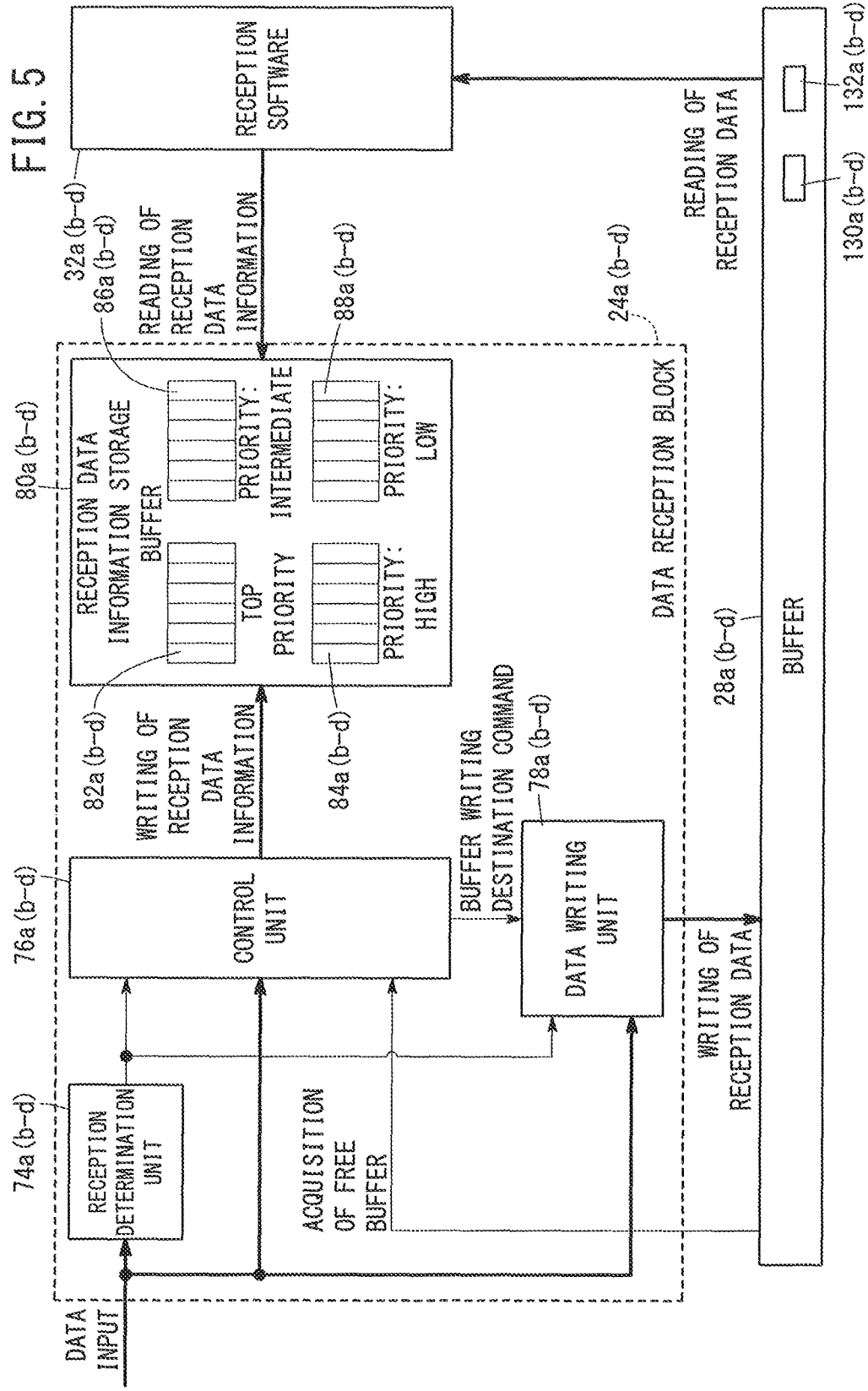
FIG. 5 is a block diagram of a data reception block shown in FIG. 2.

As shown in FIG. 5, each of the data reception blocks 24a to 24d includes a reception determination unit 74a to 74d, a control unit 76a to 76d, a data writing unit 78a to 78d, and a reception data information storage buffer 80a to 80d.

The reception determination unit 74a to 74d makes a determination as to whether or not, within the packet 100 of the transmission data which was transmitted thereto from another preceding stage node, the ID information of the transmission destination stored in the DID section matches with the ID information of the host node, or stated otherwise, determines whether it is a packet 100 addressed to the host node, and then outputs the determination result to the control unit 76a to 76d and the data writing unit 78a to 78d.

In the case that the determination result indicates that it is a packet 100 addressed to the host node, the control unit 76a to 76d determines that the concerned packet 100 should be received as reception data. Next, within the buffer 28a to 28d, the control unit 76a to 76d acquires a free buffer area thereof in which it is possible for the packet 100 to be written. In addition, the control unit 76a to 76d outputs to the data writing unit 78a to 78d a buffer writing destination command which provides an instruction to write the packet 100 with respect to an address of the acquired free buffer area, and together therewith, writes the reception data information in relation to the packet 100, including the writing destination address, in the reception data information storage buffer 80a to 80d.

On the basis of the determination result indicating that the packet 100 is addressed to the host node, and the buffer writing destination command from the control unit 76a to 76d, the data writing unit 78a to 78d writes the concerned packet 100 as reception data at the address instructed by the buffer writing destination command.

The reception data information storage buffer 80a to 80d is constituted from a plurality of buffers 82a to 82d, 84a to 84d, 86a to 86d, and 88a to 88d, which are dependent on the priority of the reception data. The priority thereof refers to a priority of the packet 100, which is stored in the PRI section of the packet 100. Accordingly, the packet 100 is stored in the buffers 82a to 82d, 84a to 84d, 86a to 86d, and 88a to 88d corresponding to the priority that is stored in the PRI section.

As a result, the reception software 32a to 32d confirms whether or not reception data information is stored in the respective buffers 82a to 82d, 84a to 84d, 86a to 86d, and 88a to 88d, and then, from among the stored reception data information, extracts the reception data information in order of information having the highest priority. Next, the reception software 32a to 32d reads out from the buffer 28a to 28d the reception data corresponding to the extracted reception data information.

[Configuration of Output Switching Units 26a to 26d]

Figure 6:
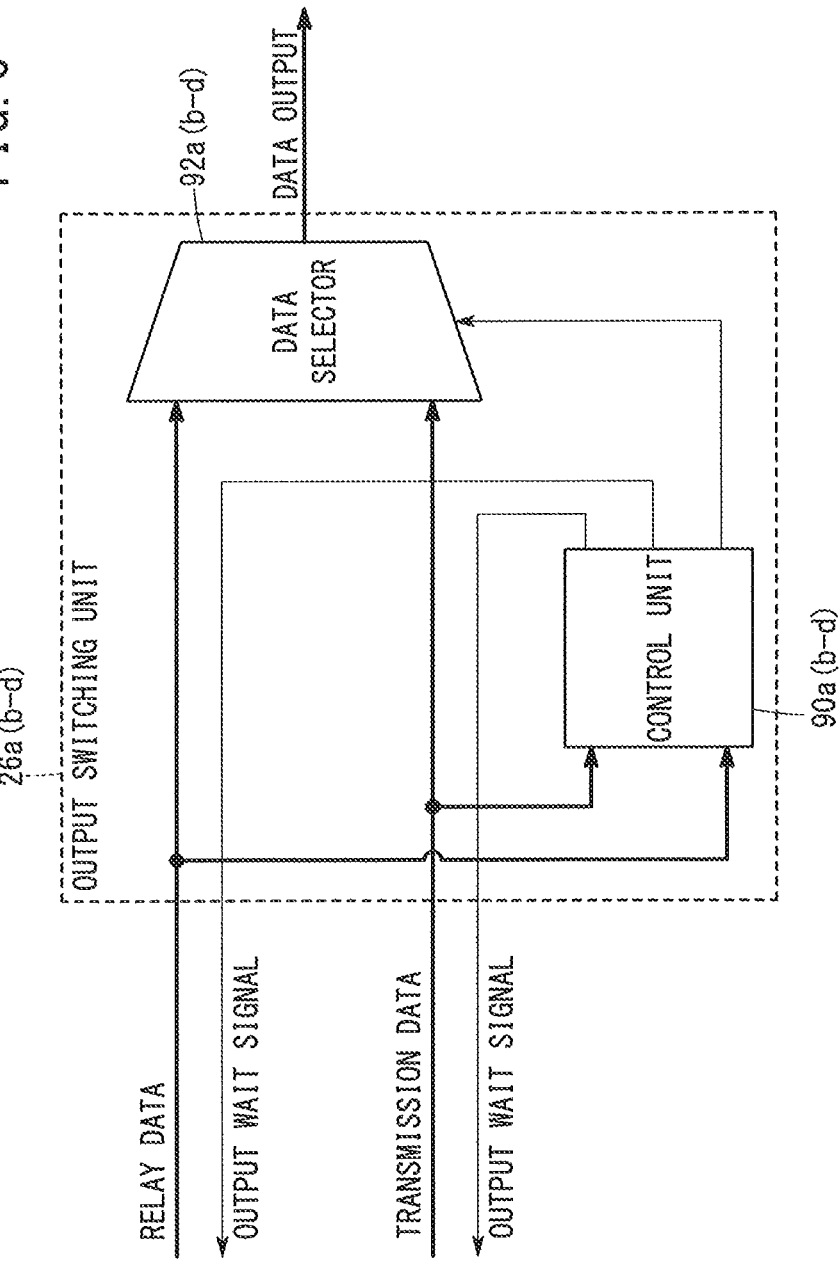
FIG. 6 is a block diagram of an output switching unit shown in FIG. 2.

As shown in FIG. 6, each of the output switching units 26a to 26d includes a control unit 90a to 90d and a data selector 92a to 92d.

The control unit 90a to 90d supplies an output wait signal to the data relay block 20a to 20d (see FIGS. 2 and 3) or the data transmission block 22a to 22d (see FIGS. 2 and 4), whereby input of data from the one block to which the output wait signal was supplied is prohibited, and together therewith, input of data from the other block to which the output wait signal was not supplied is permitted. Further, the control unit 90a to 90d supplies an output data selection signal to the data selector 92a to 92d, whereby the data input from the other block to which the output wait signal was not supplied is transmitted to the network 12 as output data from the data selector 92a to 92d.

More specifically, the control unit 90a to 90d switches between the two input data of either the relay data or the transmission data, and transmits the data as output data to the network 12 from the data selector 92a to 92d. In this case, the control unit 90a to 90d supplies the output wait signal and the output data selection signal, so that the transmission data is output from the data selector 92a to 92d more preferentially than the relay data. Further, in the data selector 92a to 92d, so as to prevent a collision of one data with other data during output of the one of the data, the control unit 90a to 90d supplies the output wait signal to the block that outputs the other data, so that the other data is not output until outputting of the one packet 100 that is the one of the data, is completed.

[Five Characteristic Functions of the Present Embodiment]

The communication system 10 according to the present embodiment is constituted substantially in the manner described above. Next, characteristic functions (first to fifth characteristic functions) of the present embodiment will be described with reference to FIGS. 8 through 14B. In relation to this description, as necessary, explanations may also be given with reference to FIGS. 1 through 7. Further, in FIGS. 8 through 14B, in order to simplify the description, constituent elements which have already been described with reference to FIGS. 1 through 7 are omitted in part, and cases exist in which such features are shown in a simplified manner.

[First Characteristic Function]

Before describing the first characteristic function, a description will be given concerning problems of the conventional technology.

Conventionally, when a plurality of nodes simultaneously carry out transmission of data in a ring type network, data collision occurs. Therefore, conventionally, as in the technique of Japanese Laid-Open Patent Publication No. 2001-326663, only nodes that have acquired a right of transmission (free token) perform transmission of data. However, as the size of the data to be transmitted increases, a problem occurs in that network efficiency decreases in a network having nodes that are not in possession of a right of transmission. Moreover, generally, with an Ethernet (CSMA/CD) based system, in accordance with a backoff algorithm, each time that a data collision occurs, the length of the wait time increases, and it is difficult to control communications in real time.

In order to solve the aforementioned problems, the first characteristic function is to avoid a collision between such data in the event there is a possibility that the relay data and the transmission data are input simultaneously to the output switching unit 26a to 26d. For this reason, the output switching unit 26a to 26d switches between the relay data or the transmission data, and transmits one of such data as output data to the network 12.

Figure 8:
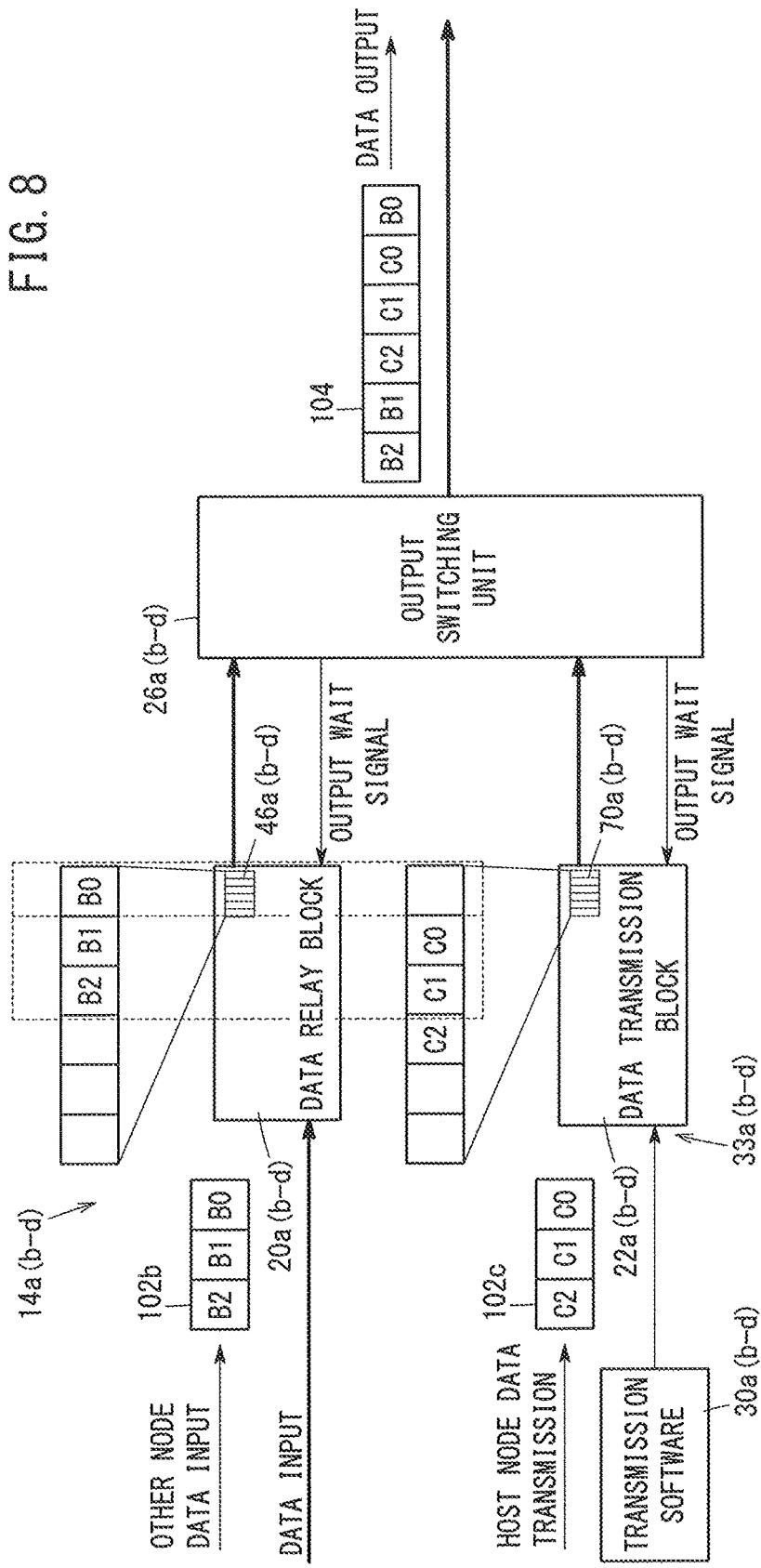
FIG. 8 is an explanatory diagram of a first characteristic function of the present embodiment.

More specifically, as shown in FIG. 8, a packet 102b from another preceding stage node is input to the data relay block 20a to 20d of the host node, and is temporarily retained in the buffer 46a to 46d. On the other hand, a packet 102c, which is transmission data of the host node, is temporarily retained in the buffer 70a to 70d of the data transmission block 22a to 22d.

As shown in FIG. 8, the B0 to B2 packets 102b, which are relay data, are input sequentially to the data relay block 20a to 20d, and are stored sequentially in the FIFO type buffer 46a to 46d. On the other hand, the C0 to C2 packets 102c, which are transmission data, are input sequentially to the data transmission block 22a to 22d, and are stored sequentially in the FIFO type buffer 70a to 70d.

In this case, the B0 packet 102b is stored in the buffer 46a to 46d earlier in time than the C0 packet 102c. Further, the B1 packet 102b and the C0 packet 102c are stored in the buffer 46a to 46d and the buffer 70a to 70d substantially at the same time, respectively. Thereafter, the B2 packet 102b and the C1 packet 102c are stored in the buffer 46a to 46d and the buffer 70a to 70d substantially at the same time, respectively. Finally, at the latest time, the C2 packet 102c is stored in the buffer 70a to 70d.

Thus, basically, the output switching unit 26a to 26d supplies an output wait signal to the data relay block 20a to 20d or the data transmission block 22a to 22d, in order to preferentially output the packet 102c as transmission data.

Initially, the B0 packet 102b is stored in the buffer 46a to 46d earlier than the other B1 and B2 packets 102b, and the C0 to C2 packets 102c. Stated otherwise, transmission data which is stored in the buffer 70a to 70d at the same time as the B0 packet 102b does not exist. Therefore, there is no need for the output switching unit 26a to 26d to prioritize output of the transmission data, and even if the B0 packet 102b is output, a judgment is made so that data collisions do not occur between the relay data and the transmission data.

In addition, the output switching unit 26a to 26b supplies an output wait signal to the data transmission block 22a to 22d. Consequently, based on the output wait signal that was supplied thereto, the data transmission block 22a to 22d stops outputting transmission data. On the other hand, since the output wait signal is not supplied thereto, the data relay block 20a to 20d extracts the B0 packet 102b stored at the head of the buffer 46a to 46d, and outputs the B0 packet 102b to the output switching unit 26a to 26d. As a result, the output switching unit 26a to 26d transmits the B0 packet 102b to the network 12.

Next, the B1 and B2 packets 102b that follow the B0 packet 102b, and the C0 and C1 packets 102c are stored in the buffer 46a to 46d and the buffer 70a to 70d substantially at the same time, respectively. Further, the C2 packet 102c that follows the C0 and C1 packets is stored in the buffer 70a to 70d. Therefore, there is a possibility for a data collision to occur when the relay data is output from the data relay block 20a to 20d, together with the transmission data being output from the data transmission block 22a to 22d.

Thus, in order to avoid a data collision from occurring between the relay data and the transmission data, together with preferentially outputting the transmission data, the output switching unit 26a to 26d supplies an output wait signal to the data relay block 20a to 20d, and together therewith, stops supplying the output wait signal to the data transmission block 22a to 22d. Consequently, the data relay block 20a to 20d receives the output wait signal, and stops the output of the B1 and B2 packets 102b. On the other hand, by the stopping of supply of the output wait signal, the data transmission block 22a to 22d sequentially extracts the C0, C1, and C2 packets 102c from the buffer 70a to 70d, and outputs the C0, C1, and C2 packets 102c sequentially to the output switching unit 26a to 26d. As a result, following the B0 packet 102b, the output switching unit 26a to 26d transmits the C0 to C2 packets 102c to the network 12.

After sending the C0 to C2 packets 102c, the output switching unit 26a to 26d stops supplying the output wait signal to the data relay block 20a to 20d, together with supplying the output wait signal to the data transmission block 22a to 22d. Owing thereto, by the stopping of supply of the output wait signal, the data relay block 20a to 20d sequentially extracts the B1 and B2 packets 102b from the buffer 46a to 46d, and outputs the B1 and B2 packets 102b sequentially to the output switching unit 26a to 26d. On the other hand, by the supplying of the output wait signal thereto, the data transmission block 22a to 22d stops outputting transmission data. As a result, following the C0 to C2 packets 102c, the output switching unit 26a to 26d transmits the B1 and B2 packets 102b to the network 12.

Accordingly, due to the above operations carried out in the nodes 14a to 14d shown in FIG. 8, the output switching units 26a to 26d are capable of transmitting packets 104, which are sent out in order of the B0, C0, C1, C2, B1, and B2 packets, in one direction over the network 12 without causing collisions between the data to occur.

In the foregoing manner, in accordance with the first characteristic function, the timing at which switching is carried out between the relay data and the transmission data is controlled, and together therewith, the relay data can temporarily be retained in the buffers 46a to 46d of the data retaining units 40a to 40d, or the transmission data can temporarily be retained in the buffers 70a to 70d of the data retaining units 56a to 56d. Consequently, even if all of the nodes 14a to 14d simultaneously transmit data, it is possible for data communications to be performed with low latency and high network efficiency without causing collisions between the data to occur.

[Second Characteristic Function]

Before describing the second characteristic function, a description will be given concerning problems of the conventional technology.

Conventionally, concerning a packet that is transmitted via a network, in the event that an end code (EOP in FIG. 7) does not arrive, it is desirable for a node that has received the packet to discard the packet when an abnormality in the packet such as a timeout or the like is detected.

In this case, in order to realize low latency, when flow of data takes place in accordance with an on-the-fly method, if a portion of an abnormal packet is delivered to a subsequent stage block, since the subsequent stage block has detected the abnormality of the packet at an early stage, it is desirable to discard the packet. However, if such a packet is a variable length packet, it is not known up to what point is required to determine that it is a normal packet, and thus the subsequent stage node cannot discard the packet.

In order to solve the aforementioned problem, the second characteristic function is a function in which, in the case that relay data flows in accordance with an on-the-fly method, after having detected an abnormality in the relay data in a preceding stage block, the abnormal relay data, error-indicating data, and idle data are sequentially transmitted in this order, the error-indicating data is detected in the subsequent stage block, and the relay data is discarded. More specifically, in accordance with the second characteristic function, an abnormality of the relay data is detected in the preceding stage block, and a detection result indicating the abnormality is transmitted to the subsequent stage block, whereupon the abnormal relay data is promptly discarded in the subsequent stage block.

Figure 9:
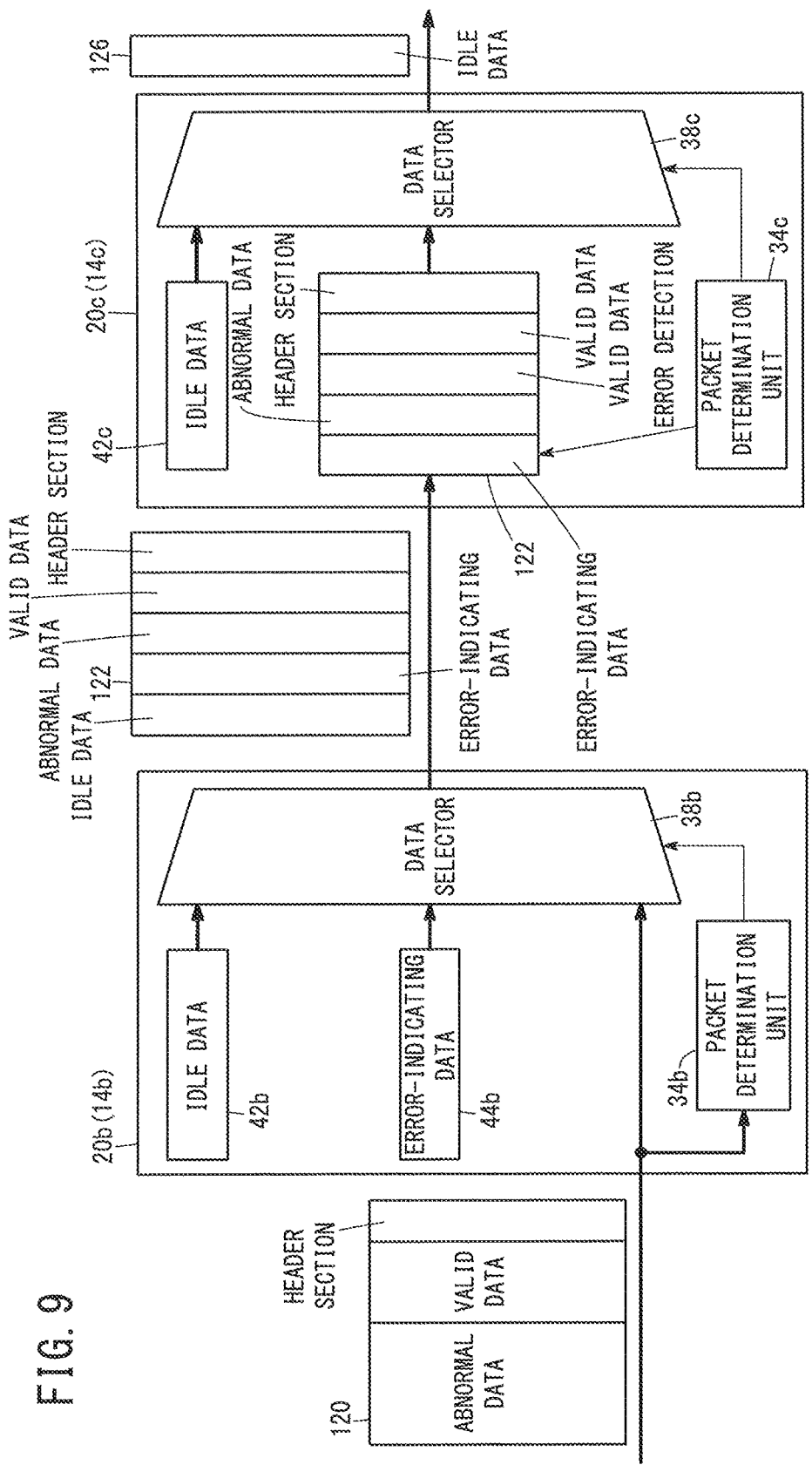
FIG. 9 is an explanatory diagram of a second characteristic function of the present embodiment.

As shown in FIG. 9, an exemplary case will be described in which the preceding stage block is the data relay block 20b of the node 14b, and the subsequent stage block is the data relay block 20c of the node 14c.

In the case that a packet 120 in the form of relay data is input to the node 14b, the packet determination unit 34b of the node 14b checks the CRC value contained within the packet 120 that flows therethrough in accordance with an on-the-fly method, and determines whether or not the CRC value is an abnormal value (abnormal data). It should be noted that the packet 120 is of the same packet structure as the packet 100 shown in FIG. 7, however, for the sake of convenience, in FIG. 9, the packet 120 is shown in a simplified manner.

In the event that the CRC value is determined to be abnormal data, the packet determination unit 34b outputs such a determination result to the control unit 36b (see FIG. 3), and the control unit 36b supplies an output data selection signal, which provides an instruction to output the error-indicating data 44b and the idle data 42b, to the data selector 38b.

The data selector 38b immediately terminates the output process of the packet 120 on the basis of the output data selection signal supplied thereto, and following the truncated packet 120, sequentially outputs the error-indicating data 44b and the idle data 42b. As a result, a new packet 122 including the truncated packet 120, the output process of which was truncated, the error-indicating data 44b, and the idle data 42b is output from the data relay block 20b. This packet 122 is transmitted from the output switching unit 26b via the network 12 to the subsequent stage node 14c. Moreover, as noted above, since outputting of the packet 120 is terminated midway, within the new packet 122, the data length corresponding to the packet 120 portion thereof is shorter than the data length of the original packet 120.

In the case that the packet 122 is input to the node 14c, the packet determination unit 34c of the node 14c checks the packet 122 that flows therethrough in accordance with an on-the-fly method. As a result, when the error-indicating data 44b is discovered, the packet determination unit 34c determines that the packet 122 is abnormal data, and outputs such a determination result to the control unit 36c (see FIG. 3). The control unit 36c supplies an output data selection signal to the data selector 38c, which provides an instruction to discard the packet 122 and to output the idle data 42c.

On the basis of the output selection signal supplied thereto, the data selector 38c outputs the idle data 42c, together with discarding the packet 122. As a result, the packet 126, which is composed of the idle data 42c, is output from the data relay block 20c. This packet 126 is transmitted from the output switching unit 26c via the network 12 to the subsequent stage node 14d. Consequently, it is possible to prevent abnormal data (packets 120 and 122) from circulating around the network 12.

In this manner, in accordance with the second characteristic function, when relay data flows in accordance with an on-the-fly method, and an abnormality in the relay data is detected in the preceding stage block, the detection result (error-indicating data 44b) which indicates that there is an abnormality is added to the end of the relay data and is transmitted to the subsequent stage block, and therefore, in the subsequent stage block, the relay data can be discarded at an early stage on the basis of the error-indicating data 44b.

Owing thereto, it is possible to prevent the relay data, which is an abnormal packet, from continuing to flow in the network 12, and the next normal relay data can be allowed to flow in the network 12 as soon as possible. As a result, any reduction in network efficiency can be minimized.

In the above description, a case has been described in which detection of abnormal data is carried out with respect to a packet 120 in the node 14b, and a packet 122 including such abnormal data is discarded in the node 14c. The second characteristic function is not limited to the aforementioned description, and it is sufficient if, at least, a process of detecting abnormal data with respect to the packet 120 can be carried out in a preceding stage block in the network 12, and the packet 122 including the abnormal data can be discarded in a subsequent stage block.

Consequently, in the second characteristic function, the packet determination unit 34a to 34d of the data relay block 20a to 20d of a preceding stage in one of the nodes 14a to 14d may also be capable of performing the detection process (determination process) for abnormal data with respect to the packet 120, the control unit 90a to 90d of the output switching unit 26a to 26d of a subsequent stage can detect the packet 122 as abnormal data, and the data selector 92a to 92d can discard the packet 122.

Further, as described above, with the second characteristic function, it is possible to perform the detection process for abnormal data with respect to the packet 120, and to carry out detection and discarding of the packet 122 across two of the nodes 14a to 14d. In accordance with this feature, for example, the control unit 90a to 90d of the output switching unit 26a to 26d that makes up the preceding stage node 14a to 14d can perform the process of detecting abnormal data with respect to the packet 120, and the packet determination unit 34a to 34d of the data relay block 20a to 20d that makes up the subsequent stage node 14a to 14d can detect the packet 122 as abnormal data. In this case, the data selector 38a to 38d of the data relay block 20a to 20d discards the packet 122.

[Third Characteristic Function]

Before describing the third characteristic function, a description will be given with reference to FIG. 10A concerning a conventional example. In the conventional example shown in FIG. 10A, the same constituent elements as those of the present embodiment are denoted with the same reference numerals.

In the communication system 110 according to the conventional example shown in FIG. 10A, the node 14a transmits a packet 112 to a transmission destination node 14d. The transmitted packet 112 is transmitted over the network 12 to the node 14d via the nodes 14b and 14c. After having confirmed the validity of the received packet 112, the node 14d sends an acknowledgment (ACK) 114 with respect to the packet 112 to the transmitting node 14a via the network 12. By receiving the ACK 114, the node 14a grasps that the transmission destination node 14d has received the packet 112, and determines that transmission of the packet 112 has been completed.

However, in such a conventional communication system 110, although it is possible to guarantee reception of the packet 112 by the transmission destination node 14d, on the other hand, the node 14d confirms the validity of the packet 112, and since the ACK 114 with respect to the packet 112 is transmitted to the node 14a only if a confirmation can be obtained, there is a problem in that latency is increased.

In order to solve such a problem, in accordance with the third characteristic function, transmission data which is transmitted from the host node circulates around the network 12, and when the transmission data returns again to the host node, transmission of the transmission data is completed, whereby low latency data communications are realized while also guaranteeing that there is no abnormality in the network 12. In this case, the other nodes in the network 12 relay the transmission data, regardless of whether or not the nodes themselves receive the transmission data. Consequently, assuming there is no malfunction such as a disconnection in the network 12 or the like, the transmission data which is transmitted from the host node is capable of traveling around the network 12 and returning to the host node.

In this instance, as shown in FIG. 10B, an exemplary case will be described in which the host node is the node 14*a*, and the packet 116, which is transmission data, is transmitted from the node 14*a* to the node 14*d*, which is another node.

In the third characteristic function, the data transmission block 22*a* (see FIGS. 2 and 4) includes the transmission completion determination unit 50*a*. In the case that a packet 116 from the node 14*a*, which is the host node, is transmitted to the node 14*d*, the packet 116 travels around the network 12 while being relayed by the nodes 14*b* to 14*d*, and is returned to the node 14*a*. If the transmission completion determination unit 50*a* determines that the received packet 116 is transmission data that was transmitted from the node 14*a*, the control unit 52*a* can complete the transmission of the packet 116, and then discard the packet 116.

Moreover, in the transmission destination node 14*d*, the data relay block 20*d* and the output switching unit 26*d* (see FIG. 2) relay the packet 116 as relay data, and the data reception block 24*d* receives the packet 116 as reception data.

More specifically, the packet 116 includes the same packet structure as that of the packet 100 shown in FIG. 7. In this case, the packet generation unit 54*a* (see FIG. 4) of the node 14*a* embeds the ID information for the node 14*a* in the SID section of the header part, and embeds the ID information for the transmission destination node 14*d* in the DID section of the trailer part, to thereby generate the packet 116. Consequently, if the packet 116 is transmitted by the node 14*a*, and within the packet 116 that has traveled around the network 12 and was received, if the ID information embedded in the SID section and the ID information of the node 14*a* match each other, the transmission completion determination unit 50*a* can easily determine that transmission of the packet 116 has been completed without the occurrence of a malfunction such as a disconnection in the network 12 or the like.

In the above description, a case was described in which the host node is the node 14*a* and the transmission destination is the node 14*d*, however, it is a matter of course that the third characteristic function can also be applied to a case in which the host node is any one of the nodes 14*b* to 14*d*. Whether or not the transmission destination node 14*d* has received the packet 116 may be guaranteed, for example, by carrying out a predetermined process on the side of the transmission software 30*a* and the reception software 32*a*.

[Fourth Characteristic Function]

Before describing the fourth characteristic function, a description will be given concerning problems of the conventional technology.

Conventionally, in the event that data is transmitted to a transmission destination node, due to the following problems, latency was increased, and data could not be reliably transmitted to the transmission destination node. More specifically, when data is transmitted without making an inquiry concerning the status (free capacity) of the buffer in the transmission destination node, even if an attempt is made to store such data in the buffer in the transmission destination node, cases may occur in which the data cannot be stored, and it becomes unavoidable to discard the data. Further, in the case that an inquiry is made concerning the status of the buffer in the transmission destination node, since data communications between the transmission source node and the transmission destination node are required in order to confirm the status of the inquiry, latency is increased. As a result, it becomes difficult to control communications in real time.

In order to solve the aforementioned problems, as shown in FIGS. 11A and 11B, the fourth characteristic function is to transmit to other nodes via the network 12 transmission data including a free buffer size of the buffer 28*b* to 28*d* of the host node, to thereby inform the other nodes of the amount of data that can be stored in the buffer 28*b* to 28*d*.

More specifically, as shown schematically in FIG. 11A, the free buffer size of the buffer 28*b* of the node 14*b* is 6 (60% free capacity), the free buffer size of the buffer 28*c* of the node 14*c* is 2 (20% free capacity), and the free buffer size of the buffer 28*d* of the node 14*d* is 8 (80% free capacity).

The packet generating unit 54*b* to 54*d* that makes up the data transmission block 22*b* to 22*d* (see FIGS. 2 and 4) of each of the nodes 14*b* to 14*d* confirms the free buffer sizes of the buffers 28*b* to 28*d*, respectively, and generates the packet 100 (see FIG. 7) in which the free buffer sizes are stored in the FBC section of the trailer part. Additionally, each of the nodes 14*b* to 14*d* transmits the packet 100, respectively, to the other nodes via the network 12.

Consequently, for example, in the data receiving block 24*a* (see FIGS. 2 and 5) of the node 14*a*, each time that the data writing unit 78*a* receives the packet 100 from each of the nodes 14*b* to 14*d*, the data writing unit 78*a* is capable of writing the free buffer size included in the packet 100 in the available capacity information register 130*a* provided in the buffer 28*a*. FIG. 11B illustrates the free buffer sizes of the respective nodes 14*a* to 14*d* that are stored in the available capacity information register 130*a*. In the available capacity information register 130*a*, the free buffer sizes (FBC) are stored in association with the ID information (SID) of the transmission source.

Further, in the fourth characteristic function, each of the nodes 14*b* to 14*d* generates a packet 100, which includes the ID information and the free buffer size of the host node (i.e., its own node) at regular intervals, and transmits the packet 100 to the other nodes via the network 12. Accordingly, each time that a packet 100 is received, the data writing unit 78*a* of the node 14*a* writes into the available capacity information register 130*a* the ID information and the free buffer size of the transmission source that are included in the packet 100. Consequently, it is possible to update the free buffer sizes in the available capacity information register 130*a* to the most recent information.

In the foregoing manner, in accordance with the fourth characteristic function, the free buffer sizes of the buffers 28*a* to 28*d* of the respective nodes 14*a* to 14*d* are notified at regular intervals, and updated to reflect the most recent information. Therefore, when data is transmitted to the transmission destination node, it is possible to grasp the condition of the buffers, without making any inquiry concerning the status of the buffer (free buffer size) in the transmission destination node. Consequently, it is possible to reliably transmit data to the transmission destination node with low latency. As a result, a communication control is enabled in which, when data is transmitted to the transmission destination node, if the free buffer size at the transmission destination node is smaller than the amount of data to be transmitted, transmission of such data is postponed, and then, when the free buffer size becomes greater than or equal to the amount of data to be transmitted, the data is transmitted to the transmission destination node.

In the above description, a case has been described in which the free buffer sizes of the buffers 28b to 28d of the nodes 14b to 14d are notified to the other nodes by transmission of the packets 100. According to the fourth characteristic function, by transmission of the packets 100, it is also possible to provide a notification to the nodes 14b to 14d concerning the free buffer size of the buffer 28a of the node 14a.

Further, in the above description, a case has been described in which the content of the available capacity information register 130a of the buffer 28a is updated each time that the node 14a receives a packet 100 from the other nodes 14b to 14d. In the other nodes 14b to 14d as well, buffers 28b to 28d are provided, respectively, with the available capacity information registers 130b to 130d thereof. Accordingly, in the respective nodes 14b to 14d as well, each time that a packet 100 is received from another node, it is possible to update the free buffer sizes stored in the available capacity information register 130b to 130d so as to reflect the most recent content.

[Fifth Characteristic Function]

Before describing the fifth characteristic function, a description will be given concerning problems of the conventional technology. Conventionally, in the ring type network 12, when disconnection of the network 12 or failure of the nodes 14a to 14d occurs, unidirectional communications on the network 12 become impossible. In addition, it is also difficult to specify at which location on the network 12 the failure such as disconnection or the like has occurred.

In order to solve the aforementioned problems, as shown in FIGS. 12A through 14B, the fifth characteristic function is a function in which, in the event that ID information and the hop count of the host node are embedded in the packet 100 and transmitted, in each of the nodes 14a to 14d, with each time the packet 100 is relayed, the hop count stored in the HOP section of the packet 100 is incremented by +1, the packet 100 travels around the network 12, and is returned to the host node.

More specifically, the packet generating units 54a to 54d that make up the data transmission blocks 22a to 22d (see FIGS. 2 and 4) of the nodes 14a to 14d, respectively, have stored therein the ID information of the host node in the SID section, and generate the packet 100 (see FIG. 7) in which the hop count of the HOP section thereof is set to zero. In addition, each of the nodes 14a to 14d transmits the packet 100 to the network 12.

In accordance with this feature, as shown in FIG. 12A, for example, at times that the network 12 is operating normally, the packet 100 transmitted from the node 14a travels around the network 12 through the nodes 14b to 14d, and returns to the node 14a. In this case, in the data relay blocks 20b to 20d (see FIGS. 2 and 3) of the respective nodes 14b to 14d, the control units 36b to 36d increment the hop count stored in the HOP section of the packet 100 by +1. More specifically, each time that the packet 100 is relayed by each of the nodes 14b to 14d, the hop count is incremented by +1. Accordingly, in the case that the packet 100 is received at the node 14a by traveling around the network 12, the hop count stored in the HOP section of the packet 100 becomes 3 (HOP=3).

Similarly, in the case that packets 100 are transmitted from each of the respective nodes 14b to 14d, and then return thereto by traveling around the network 12, in the configuration of FIG. 12A, upon returning to their own host nodes, the hop count of the packets 100 each become 3, respectively.

Stated otherwise, at a time of normal operation in FIG. 12A, each of the nodes 14a to 14d transmits the packet 100 from its own node as a host node, and when the packet 100 travels once around the network 12 and returns, the hop count of the packet 100 is confirmed, whereby it is possible to grasp the number of relays of the network 12 as viewed from the perspective of the host node, or in other words, the number of other nodes that are connected to the network 12.

Further, the data relay block 20a to 20d of each of the respective nodes 14a to 14d relays the packets 100 sent thereto from the other nodes. At this time, the packets 100 are also received by the data reception block 24a to 24d (see FIGS. 2 and 5). Therefore, by confirming the ID information (SID) of the transmission source and the hop count (HOP), which are stored in the packets 100 that serve as relay data, the data reception block 24a to 24d grasps the positional relationship and the connection state of the transmission source with respect to the host node.

In addition, each time that the data writing unit 78a to 78d of the data reception block 24a to 24d receives a packet 100, the ID information stored in the SID section and the hop count stored in the HOP section of the packet 100 are stored by the data writing unit 78a to 78d in the hop count register 132a to 132d provided in the buffer 28a to 28d.

FIG. 12B is a view showing the hop count register 132a that is provided in the buffer 28a of the node 14a. In this case, each time that the data writing unit 78a receives a packet 100, the data writing unit 78a writes into the hop count register 132a the ID information (SID) of the transmission source and the hop count (HOP) that are included in the packet 100, and updates them to reflect the most recent information. Accordingly, in the node 14a, by confirming the content of the hop count register 132a, it is possible to easily grasp the positional relationship and the connection state of the other nodes 14b to 14d with respect to the node 14a.

Moreover, in accordance with the fifth characteristic function, time data may also be embedded in the packet 100 and transmitted therewith. Owing to this feature, if the packet 100 is not received as reception data, even after a certain period of time has elapsed since the packet 100 was transmitted from the host node, it can be determined that a malfunction has occurred in the network 12.

Next, a case in which the nodes 14a to 14d are connected with a mistaken connection order in the network 12 will be described with reference to FIGS. 13A and 13B. In this case, similar to the time of normal operation shown in FIG. 12A, the node 14a transmits a packet 100 including the hop count and the ID information of the host node. In this case, concerning the nodes 14b to 14d, even when a connection error occurs therein, assuming there is no failure such as a disconnection in the network 12 itself, each time that the packet 100 is relayed, the respective nodes 14b to 14d increment the hop count by +1, and transmit the packet 100 after having incremented the hop count.

Similarly, even in the case that a packet 100 that is generated at the host node, is transmitted respectively to the network 12 from each of the nodes 14b to 14d, each time that the packet 100 is relayed by the other nodes, the hop count is incremented by +1, and thereafter, the packet 100 after having incremented the hop count is transmitted.

FIG. 13B is a view showing, in the configuration of FIG. 13A, the hop count register 132a that is provided in the buffer 28a of the node 14a. In this case, the hop count and the ID information of the transmission source are stored in the hop count register 132a, both in relation to the case at the time of normal operation (see FIG. 12B), and the case (refer to FIG. 13B) at the time of a connection error, such as shown in FIG. 13A. Assuming such cases, by comparing the two situations, it is possible to easily grasp whether or not a connection error has occurred, and furthermore, what kind of connection error has occurred in comparison with the time of normal operation.

Next, a case in which a malfunction such as a disconnection or the like has occurred in the network 12 will be described with reference to FIGS. 14A and 14B. In this case, similar to the time of normal operation shown in FIG. 12A, the node 14a transmits a packet 100 including the hop count and the ID information of the host node.

For example, in the case that a disconnection occurs on the network 12 between the node 14a and the node 14b, since a packet 100 cannot be transmitted forward from the disconnected location, such a packet 100 cannot travel around the network 12. Consequently, the node 14a cannot receive the packet 100 sent from itself, i.e., the host node.

On the other hand, each of the nodes 14b to 14d generates a packet 100, respectively, and transmits the packet 100 toward the node 14a. In this case, since there is no other disconnected location in the direction in which the respective packets 100 are transmitted, each of these packets 100 is input to the node 14a. In this case as well, in each of the nodes 14c and 14d, each time that the packets 100 are relayed thereby, the hop count is incremented by +1, and thereafter, the packets 100 after having incremented the hop count are transmitted.

FIG. 14B is a view showing, in the configuration of FIG. 14A, the hop count register 132a that is provided in the buffer 28a of the node 14a. In this case as well, the hop count and the ID information of the transmission source are stored in the hop count register 132a, both in relation to the case at the time of normal operation (see FIG. 12B), and the case (refer to FIG. 14B) at the time of a malfunction, such as shown in FIG. 14A. Assuming such cases, by comparing the two situations, it is possible to easily grasp whether or not a malfunction has occurred, and furthermore, at what location the malfunction occurred in comparison with the time of normal operation.

In this manner, according to the fifth characteristic function, the packet 100 in which the hop count is embedded circulates around the network 12, and the hop count is incremented by +1 each time that the nodes 14a to 14d relay the packet 100. Therefore, the nodes 14a to 14d that are connected to the network 12 can be detected at all times, and it is possible to specify a failure location such as a disconnection or the like. Further, in the event that a node 14a to 14d exists in which a software hang-up has occurred, the packets 100 are not transmitted from the node 14a to 14d, and the hop count is not updated, and therefore, it is possible to detect that a failure has occurred in such a node 14a to 14d. Furthermore, by specifying the failure target, it is possible to perform a fail-soft operation over the entire communication system 10, such as performing a degeneration operation or the like on the network 12.

Moreover, although in FIGS. 12A to 14B, as an example, a case was illustrated in which the node 14a was assumed to be the host node, it goes without saying that this feature of the invention can be applied in the same manner, even if any of the other nodes 14b to 14d is treated as the host node.

[Effects of the Present Embodiment]

In the communication system 10 according to the present embodiment, each of the data transmission units 33a to 33d includes the data transmission block 22a to 22d that transmits, as transmission data, data generated by the host node, and the data relay block 20a to 20d that relays the transmission data, which was transmitted thereto, as relay data. Further, the data reception block 24a to 24d receives, as reception data, the transmission data transmitted from the other network nodes. The output switching unit 26a to 26d switches and outputs as output data either one of the data from among the transmission data transmitted by the data transmission block 22a to 22d, or the relay data relayed by the data relay block 20a to 20d.

Ordinarily, in the network 12 which has a ring type of network topology, each of the nodes 14a to 14d is constructed with a transmission line and a reception line being separated. Therefore, it can be considered that the transmission lines of each of the nodes 14a to 14d possess exclusive ownership rights respectively in relation to data transmission.

Thus, according to the present embodiment, as a new protocol in a ring type network 12, as the output data, the output switching unit 26a to 26d switches and outputs either one of the data from among the transmission data or the relay data. As a result of having constructed the new protocol of this type, with all of the nodes 14a to 14d, it becomes possible to simultaneously transmit the output data without causing any collisions to occur between the transmission data and the relay data. Accordingly, the present embodiment is capable of realizing a communication system 10 in which both low latency and network efficiency are improved. As a result, according to the present embodiment, even concerning large volume data such as firmware (F/W) data and hardware (H/W) data, or log data and the like, it becomes possible for such data to be transferred in a shorter time in comparison with the conventional technique.

Next, effects of the first to fifth characteristic functions will be described.

[Effects of the First Characteristic Function]

The output switching unit 26a to 26d preferentially outputs in the form of output data the transmission data that was transmitted by the data transmission block 22a to 22d. In accordance with this feature, it is possible for data communications to be carried out in real time, without causing collisions to occur between the relay data, which is transmission data from the other nodes, and the transmission data of the host node. As a result, even if all of the nodes 14a to 14d simultaneously carry out data communications, it is possible for data communications to be performed with high network efficiency without causing collisions between the data to occur.

Further, the data relay block 20a to 20d includes the data retaining unit 40a to 40d that temporarily retains the relay data during a period in which the output switching unit 26a to 26d preferentially outputs the transmission data transmitted by the data transmission block 22a to 22d. In accordance with this feature, since the relay data is output after output of the transmission data has been completed, it is possible to reliably avoid collisions between the relay data and the transmission data, as well as to enhance network efficiency.

Furthermore, the data transmission block 22a to 22d does not carry out transmission of next transmission data until the transmission data transmitted by the data transmission block 22a to 22d travels around the network 12 and is returned to the data transmission block 22a to 22d. In accordance with this feature, it is possible to ensure a transmission time for the relay data, together with minimizing the relay time of the relay data. Further, it is also possible to effectively avoid collisions between the relay data and the transmission data, and to enhance network efficiency.

Further still, the output switching unit 26a to 26d outputs to the data transmission block 22a to 22d or the data relay block 20a to 20d an output wait signal instructing to wait on outputting the data, and a block to which the output wait signal has not been input from among the data transmission block 22a to 22d or the data relay block 20a to 20d transmits data to the output switching unit 26a to 26d. In accordance with this feature, it is possible to reliably avoid collisions between the relay data and the transmission data.

[Effects of the Second Characteristic Function]

The data transmission unit 33a to 33d and the output switching unit 26a to 26d of the respective nodes 14a to 14d are each provided with an error detecting unit (packet determination unit 34a to 34d, control unit 90a to 90d) which is capable of detecting an abnormality in the data while outputting the data in accordance with an the on-the-fly method. In this case, for example, when the packet determination unit 34a to 34d detects a data abnormality, the data transmission unit 33a to 33d adds to the data the error-indicating data 44a to 44d, which indicates that there is an abnormality in the data.

More specifically, in order to reduce idle time insofar as possible and to realize low latency communications, in the case of outputting data using an on-the-fly method, the error-indicating data 44a to 44d is added with respect to the abnormal data, and then the data is output. As a result, by confirming the error-indicating data 44a to 44d, the subsequent stage block can easily grasp that the data input thereto is abnormal data, and can discard the abnormal data at an early stage. Consequently, it is possible to send out normal data that is to be transmitted next as soon as possible, as well as to keep to a minimum any decrease in network efficiency.

Further, in the event that an abnormality in the data is detected, the data transmission unit 33a to 33d or the output switching unit 26a to 26d that includes the error detecting unit truncates output of the data midway, adds the error-indicating data 44a to 44d to the end of the truncated data, and then outputs the data. Owing to this feature, in the subsequent stage block, it is possible to grasp and discard the abnormal data at an early stage, and any reduction in network efficiency can reliably be suppressed.

Furthermore, at a time that the output switching unit 26a to 26d or the data transmission unit 33a to 33d of a subsequent stage receives the truncated data, and the error-indicating data 44a to 44d is detected by its own error detecting unit, the output switching unit 26a to 26d or the data transmission unit 33a to 33d of the subsequent stage discards the truncated data, and outputs the idle data 42a to 42d. In accordance with this feature, it is possible to avoid continuing to circulate the truncated data around the ring type network 12.

Further still, in the event that an abnormality in the data is detected by the error detecting unit, the data transmission unit 33a to 33d or the output switching unit 26a to 26d that includes the error detecting unit sequentially outputs the truncated data and the error-indicating data 44a to 44d, and thereafter, outputs the idle data 42a to 42d until the next data is input. Owing to this feature, in the subsequent stage block, it is possible to easily grasp that, from among the input data, the data up to just before the error-indicating data 44a to 44d is abnormal data.

[Effects of the Third Characteristic Function]

Each of the data transmission blocks 22a to 22d of the respective nodes 14a to 14d includes the transmission completion determination unit 50a to 50d which determines whether or not the reception data is transmission data generated by the host node. In addition, in the event it is determined by the transmission completion determination unit 50a to 50d that the reception data is transmission data generated by the host node, the data transmission block 22a to 22d completes transmission of the transmission data.

Conventionally, transmission data is transmitted from the host network node to a transmission destination node, and the host node receives the ACK 114 from the transmission destination node which has received the transmission data, whereupon transmission of the transmission data is completed. In this case, it is possible to guarantee that the transmission destination node has received the transmission data. Notwithstanding, on the other hand, there has been a problem in that latency is increased.

In contrast thereto, according to the third characteristic function, since the data transmission block 22a to 22d includes the transmission completion determination unit 50a to 50d, the transmission data that is transmitted from the host node travels around the network 12, and when the transmission data is received as reception data by the host node, transmission of the transmission data can be completed. In accordance with this feature, although there is no guarantee that the transmission destination node has received the transmission data, it is assured that there are no abnormalities in the network 12, together with enabling low latency data communications.

Further, the transmission data and the reception data are packets 100 including a header part, a data part, and a trailer part, and the ID information (SID) of the host network node is embedded in the header part, and the ID information (DID) of the transmission destination node is embedded in the trailer part. In this case, the transmission completion determination unit 50a to 50d determines that the reception data is transmission data generated at the host node, if the ID information embedded in the header part matches with the ID information of the host node. In addition, the data transmission block 22a to 22d receives the determination result of the transmission completion determination unit 50a to 50d, completes transmission of the transmission data, and then discards the transmission data.

In accordance with this feature, it becomes possible to efficiently determine completion of transmission of the transmission data, together with carrying out packet communications with low latency.

[Effects of the Fourth Characteristic Function]

The data transmission block 22a to 22d of each of the nodes 14a to 14d embeds the ID information of the host node and the free buffer size of the buffer 28a to 28d in the transmission data (packet 100), and then transmits the data.

In accordance with this feature, other nodes that have received the transmission data as the relay data or the reception data are able to easily grasp how much of a free buffer size exists in the buffer 28a to 28d of the transmission source node (i.e., the host node). Consequently, when data is transmitted with respect to the transmission source node, the other nodes may transmit an amount of data while taking into consideration the free buffer size. As a result, it is possible to avoid discarding of preciously transmitted data by the transmission destination node due to there being no available capacity in the buffer 28a to 28d of the transmission destination node, and therefore, the data can reliably be transmitted.

Further, since each of the nodes 14a to 14d embeds the ID information and the free buffer size in the transmission data and then transmits the data, there is no need for the respective nodes 14a to 14d to make an inquiry with respect to the transmission source node concerning the free buffer size. As a result, data communications can be performed with low latency.

Further, each of the nodes 14a to 14d stores the ID information of the respective nodes 14a to 14d and the free buffer size of the buffer 28a to 28d in the available capacity information register 130a to 130d provided in the buffer 28a to 28d. In this case, each time that the data reception block 24a to 24d of each of the nodes 14a to 14d receives the reception data, the ID information of the other nodes and the free buffer sizes of the buffers 28a to 28d included within the reception data are stored in the available capacity information register 130a to 130d. In accordance with this feature, each time that the reception data is received, the content of the available capacity information register 130a to 130d is updated. Therefore, each of the nodes 14a to 14d can easily grasp the most recent available capacity of each of the buffers 28a to 28d, and thus, efficient data communications with low latency are made possible while taking into account the most recent available capacity of the buffers 28a to 28d.

Furthermore, the transmission data and the reception data are packets 100 including a header part, a data part, and a trailer part, and the data transmission block 22a to 22d of each of the nodes 14a to 14d may embed the ID information of the host node in the header part, together with embedding the free buffer size in the trailer part. As a result, the free buffer size of the buffer 28a to 28d of the host node can be efficiently notified with respect to the other nodes by way of packet communications.

[Effects of the Fifth Characteristic Function]

The data transmission block 22a to 22d of each of the nodes 14a to 14d embeds the ID information and the hop count of the host node in the transmission data, and then transmits the data. Further, the data relay block 20a to 20d of each of the nodes 14a to 14d transmits the relay data after having incremented by +1 the hop counts of the other network nodes included within the relay data.

In accordance with this feature, from the ID information and the hop counts included within the reception data, or the ID information and the hop counts included within the relay data, each of the network nodes 14a to 14d is capable of easily grasping in what kind of positional relationship the transmission source node 14a to 14d of the reception data and the relay data is with respect to the host node, and furthermore, the state of connection of the transmission source node 14a to 14d in the network 12.

Further, each time that the data reception blocks 24a to 24d receive the reception data, the respective nodes 14a to 14d store the ID information of the respective nodes 14a to 14d and the hop counts included within the reception data in the hop count registers 132a to 132d provided in the buffers 28a to 28d. Owing to this feature, since the contents of the hop count registers 132a to 132d are updated each time that the reception data is received, each of the nodes 14a to 14d is capable of easily grasping the most recent positional relationship of the other nodes with respect to the host node, as well as the most recent state of connection of the other nodes in the network 12.

Furthermore, ID information of the respective nodes 14a to 14d, and a set value of the hop count of the respective nodes 14a to 14d with respect to the host node preferably are stored beforehand in each of the hop count registers 132a to 132d. In accordance with this feature, at each time that the reception data is received, the data reception block 24a to 24d of each of the nodes 14a to 14d compares the hop count and the ID information of the respective nodes 14a to 14d included within the reception data with the set value that is stored in the hop count register 132a to 132d, and thereby is capable of determining the presence or absence of a connection error of each of the nodes 14a to 14d in the network 12.

Further still, in the event that the transmission data is not received as reception data, even after a certain time period has elapsed from the data transmission block 22a to 22d having embedded the hop count and the ID information of the host network node, and having transmitted the transmission data, the data reception blocks 24a to 24d of each of the nodes 14a to 14d is capable of determining that a malfunction has occurred in the network 12.

Further, the data transmission block 22a to 22d of each of the nodes 14a to 14d transmits at regular intervals the transmission data in which there are embedded the hop count and the ID information of the host node. Owing to this feature, if the hop count from a certain node 14a to 14d is not renewed in a certain period of time, it can easily be determined that the node 14a to 14d is faulty, or that some type of malfunction is taking place in the network 12.

Furthermore, the transmission data, the relay data, and the reception data are packets 100 including a header part, a data part, and a trailer part, and the ID information and the hop count of the host node are embedded in the header part. In accordance with this feature, it is possible to reliably notify the other nodes concerning the ID information and the hop count of the host node.

[Effects of the Embodiment when Applied to a Robot]

In the case that the communication system 10 according to the above-described present embodiment is applied to a robot, the following effects can be obtained.

In the case of a robot, there is also a relationship concerning space, and in order to reduce the number of cables and reduce the number of lines, data communications performed over a ring type network are preferred. This is because, if a network other than the ring type network is constructed, the number of cables tends to increase, and there is a possibility for degradation or the like in the signals that propagate through such cables to occur.

In addition, in a robot, in the case that motors are provided in a head part and respective joint parts or the like, it is necessary to promptly transmit control data from a main control unit to each of respective sub-control units. Further, in the case of transmitting a large amount of data via a network, it is necessary to carry out transmission of the data without a reduction in network efficiency. Stated otherwise, it is necessary to improve the robustness of the data communications, as well as to increase the reliability of such data communications.

Thus, assuming that the communication system 10 according to the present embodiment is applied to a distributed control system for a robot, in accordance with the first to fifth characteristic functions described above, it is possible to avoid collisions between data from occurring in the network 12, data communications with low latency are enabled, and network efficiency is improved. As a result, the robustness of the data communications in the robot becomes favorable, and the respective motors of the robot can be driven simultaneously. Further, in the robot to which the communication system 10 is applied, various advantageous effects owing to the aforementioned first to fifth characteristic functions can easily be obtained.

Although the present invention has been described above with reference to a certain embodiment, the technical scope to which the present invention can be applied is not limited to the scope discussed above in reference to the aforementioned embodiment. More specifically, it will be apparent to those skilled in the art that various modifications or improvements can be added to the aforementioned embodiment. It should be readily apparent from the scope of the claims that embodiments in which such modifications or improvements are added can be included within the technical scope of the present invention.

The invention claimed is:

1. A communication system that utilizes a ring type network in which a plurality of network nodes forms a ring-like shape and which is adapted to perform communications in one direction;

wherein each of the network nodes comprises:

a data transmission unit having a data transmission block adapted to transmit, as transmission data, data generated by a host network node, and a data relay block adapted to relay, as relay data, transmission data transmitted from other network nodes;

a data reception unit adapted to receive, as reception data, the transmission data transmitted from the other network nodes; and an output switching unit adapted to switch and output as output data either one of the data from among the transmission data transmitted by the data transmission block, or the relay data relayed by the data relay block, wherein at least one from among the data transmission unit and the output switching unit of each of the network nodes includes an error detecting unit adapted to detect an abnormality in the data while outputting the data in accordance with an on-the-fly method; and when the error detecting unit detects the abnormality in the data, the data transmission unit or the output switching unit that includes the error detecting unit adds to the data, error data which is indicative of a fact that the abnormality exists in the data, and then outputs the data, and wherein, in the event that the abnormality in the data is detected by the error detecting unit, the data transmission unit or the output switching unit that includes the error detecting unit truncates output of the data midway, adds the error data to an end of truncated data, and then outputs the data.

2. The communication system according to claim 1, wherein, at a time that the output switching unit or the data transmission unit of a subsequent stage receives the truncated data, and the error data is detected by the corresponding error detecting unit, the output switching unit or the data transmission unit of the subsequent stage discards the truncated data, and outputs idle data.

3. The communication system according to claim 1, wherein:

the error detecting unit is disposed in the data relay block of each of the network nodes; and in the event that the abnormality in the relay data is detected by the error detecting unit, the data relay block sequentially outputs truncated relay data and the error data, and thereafter, outputs other idle data until a next relay data is input thereto.

* * * * *